United States Patent [19]

Morikita

[11] Patent Number: 5,403,370

[45] Date of Patent: Apr. 4, 1995

[54] GLASS COMPRESSION MOLDING APPARATUS

[75] Inventor: Nobuo Morikita, Chiba, Japan

[73] Assignee: Sumitomo Heavy Industries, Ltd., Japan

[21] Appl. No.: 47,502

[22] Filed: Apr. 19, 1993

[30] Foreign Application Priority Data

Apr. 21, 1992 [JP] Japan .................................. 4-101220
Feb. 26, 1993 [JP] Japan .................................. 5-038340

[51] Int. Cl.6 ............................................ C03B 11/00
[52] U.S. Cl. ...................................... 65/286; 65/361; 65/305; 65/318
[58] Field of Search .................. 65/64, 260, 286, 361, 65/305, 318, 320, 102, 104, 66, 226

[56] References Cited

U.S. PATENT DOCUMENTS

| | | | |
|---|---|---|---|
| 3,951,636 | 4/1976 | Günthner | 65/305 |
| 4,199,342 | 4/1980 | Mestre | 65/104 |
| 4,273,567 | 6/1981 | Scholl | 65/305 |

FOREIGN PATENT DOCUMENTS

| | | | |
|---|---|---|---|
| 2137739 | 5/1990 | Germany | 65/305 |
| 4002681 | 8/1990 | Germany | 65/305 |
| 2243525 | 9/1990 | Japan | 65/305 |

OTHER PUBLICATIONS

Websters New International Dictionary of the English Language, Merriam-Webster, 1937, Springfield, Mass.

Primary Examiner—W. Gary Jones
Assistant Examiner—John M. Hoffmann
Attorney, Agent, or Firm—Lorusso & Loud

[57] ABSTRACT

A glass compression molding apparatus includes a horizontal upper platen and a lower platen disposed parallel to the upper platen. A top die is mounted for movement along the upper platen between a plurality of stations, and a bottom die is mounted for movement along the lower platen between another plurality of stations. A preform is introduced into the bottom die and then heated and compressed to form a molded product. The molded product is annealed and then removed from the bottom die. A clamping device forces the upper and lower platens together. A compression device compresses the preform. A conveying device moves at least the bottom die while suspended above the lower platen. Thus, wear of the lower platen, which would otherwise result from the sliding of the bottom die on the lower platen or the entry of foreign matter between the bottom die and the lower platen, is avoided. Such a wear or entry of foreign matter would occur while the mold is moved between stations in the conventional apparatus. Therefore, the alignment of the mold can be maintained, and the dimensional accuracy of the product can be improved.

12 Claims, 22 Drawing Sheets

GLASS COMPRESSION MOLDING APPARATUS

BACKGROUND OF THE INVENTION

The present invention relates to a glass compression molding apparatus.

Conventionally, molding of, for example, an optical glass lens is performed in the manner described below: a glass material which has been melted and solidified beforehand is cut out in a required amount. After the glass material is subjected to grinding or other treatments, it is molded to form a glass preform having a predetermined shape. The glass preform is then introduced into a mold having a high-precision molding shape and then compressed while it is heated at a high temperature. Thereafter, the preform is annealed, and the molded product is then removed from the mold.

In order to heat and anneal the preform effectively, heating and annealing stations are provided, and the mold is moved between the stations.

FIG. 1 illustrates a conventional glass compression molding apparatus.

In FIG. 1, a mold 11 has a bottom die 11a and a top die 11b. A preform 13 is introduced between the bottom die 11a and the top die 11b. The preform 13 is preliminarily shaped by cutting a glass material which has been melted and solidified in a required amount and then grinding or otherwise shaping the glass material. The preform 13 has, for example, a rice ball-like shape. A sleeve 14 is disposed surrounding the bottom die 11a and the top die 11b and extends between the two dies to guide the top die 11b. The mold 11 is caused to slide along a platen 15 having a flat surface.

In a mold introduction station A, the preform 13 is placed on the bottom die 11a, and then the top die 11b is lowered along the sleeve 14, whereby the mold 11 is set. This setting work is done manually.

The mold 11 which has been thus set is automatically moved to a heating station B. In the heating station B, an upper high-temperature hot plate 16 is provided in such a manner as to be movable in the vertical direction, and a lower high-temperature hot plate 17 is buried in the platen 15. When the mold 11 has arrived at the heating station B, the upper high-temperature hot plate 16 moves downward to grip the mold 11 between the two plates 16 and 17. Heat is transmitted from the upper and lower hot plates 16 and 17 through the mold 11 to the preform 13 to heat the preform 13 to 500° C.

Subsequently, the mold 11 is automatically moved to a compression station C. At the compression station C are located an upper high-temperature, vertically movable hot plate 18 and a lower high-temperature hot plate 19 buried in the platen 15. When the mold 11 has arrived at the compression station C, the upper high-temperature hot plate 18 moves downward to grip the mold 11 between the upper and lower hot plates 18 and 19 and thereby heats and softens the preform 13. At that time, the preform 13 is compressed to form a product 20 having a shape corresponding to the cavity of the mold 11.

Next, the mold 11 is automatically moved to an annealing station D. At the annealing station D are located an upper annealing, vertically movable hot plate 21 and a lower annealing hot plate 22 buried in the platen 15. When the mold 11 has arrived at the annealing station D, the upper annealing hot plate 21 moves downward to grip the mold 11 between the upper and lower hot plates 21 and 22. Consequently, the product 20 is annealed to 400° C.

The mold 11 is automatically moved to a mold removal station E. The mold 11 which has arrived at the mold removal station E is manually disassembled to remove the product 20.

In the conventional glass compression molding apparatus of the above-described type, setting of the mold 11 at the mold introduction station A, which is performed by introducing the preform 13 into the mold 11, and removal of the product 20 at the mold removal station E, which is performed by disassembling the mold 11, must be conducted manually, making these steps troublesome and increasing the production cost.

Furthermore, since a large number of mold pairs (for example 10 pairs) are needed, variations in the dimensions of the individual molds 11 or in the maintenance thereof affects the precision of the products 20, making production of products 20 having a consistent quality difficult.

Furthermore, the upper and lower surfaces of the mold 11 readily wear. If foreign matter enters between any combination of the components including the upper high-temperature hot plates 16, 18, the lower high-temperature hot plates 17, 19, the upper annealing hot plate 21, the lower annealing hot plate 22 and the platen 15, the dimensional accuracy of the product 20 deteriorates.

FIG. 2 shows the state of a mold in a conventional glass compression molding apparatus.

In FIG. 2, reference numeral 11 denotes a mold; 11a, a bottom die; 11b, a top die; 18, an upper high-temperature hot plate; 19, a lower high-temperature hot plate; and 23, foreign matter which enters between the bottom die 11a and the lower high-temperature hot plate 19.

The bottom die 11a is inclined due to the presence of the foreign matter 23. Consequently, the upper and lower surfaces of the mold 11 are not parallel and the dimensional accuracy of the product 20 (FIG. 1) suffers.

SUMMARY OF THE INVENTION

In view of the aforementioned problems of the conventional glass compression molding apparatus, an object of the present invention is to provide a glass compression molding apparatus which is capable of easily manufacturing products having a consistent quality, and which enables the dimensional accuracy of the products to be improved.

Hence, a glass compression molding apparatus according to the present invention includes an upper platen disposed horizontally, and a lower platen disposed parallel to the upper platen. A top die is movable along the upper platen between a plurality of stations, and a bottom die is movable along the lower platen between a plurality of stations. While the top and bottom dies are moved between the plural stations, introduction of a preform into the bottom die, clamping, heating and compression are performed to mold a product. The molded product is annealed and then removed from the bottom die. A clamping device provides a clamping force between the upper and lower platens.

A conveying means is provided to move at least the bottom die while holding it suspended above the lower platen. Thus, wear of the lower platen caused by the sliding of the bottom die on the lower platen or by entry of foreign matter between the bottom die and the lower platen is avoided. Such wear or entry of the foreign matter occurs when the mold is moved between any combination of the stations in the conventional apparatus. Therefore, the degree of parallelism of the mold can be maintained high (to, for example, <5 [μm]), and the dimensional accuracy of the product can be improved.

The top die is movable between a clamping/heating-/compression station in which clamping, heating and compression are performed and an annealing station in which annealing is performed, and the bottom die is movable between any combination of the clamping-/heating/compression station in which clamping, heating and compression are performed, the annealing station in which annealing is performed and a preform introduction/product removal station.

The annealing station includes left and right annealing substations located at two positions adjacent to the clamping/heating/compression station. The preform introduction/product removal station includes a left preform introduction/product removal substation located adjacent to the left annealing station, and a right preform introduction/product removal substation located adjacent to the right annealing substation.

With a top die located in each of the left annealing substation, the clamping/heating/compression station and the right annealing substation, and a bottom die will be located in each of the left preform introduction/-product removal substation, the left annealing substation, the clamping/heating/compression station, the right annealing substation and the right preform introduction/product removal substation.

It is thus possible to simultaneously perform two different operations at two different stations, thus improving the operation efficiency.

The conveying means has a support rod which advances or retracts with its distal end supporting the bottom die.

BRIEF DESCRIPTION OF THE DRAWINGS

The structure and characteristics of the glass compression molding apparatus according to the present invention will be further explained with reference to the following figures, in which.

DESCRIPTION OF THE PREFERRED EMBODIMENTS

Embodiments of the present invention will be described below with reference to the accompanying drawings.

Figure 3:
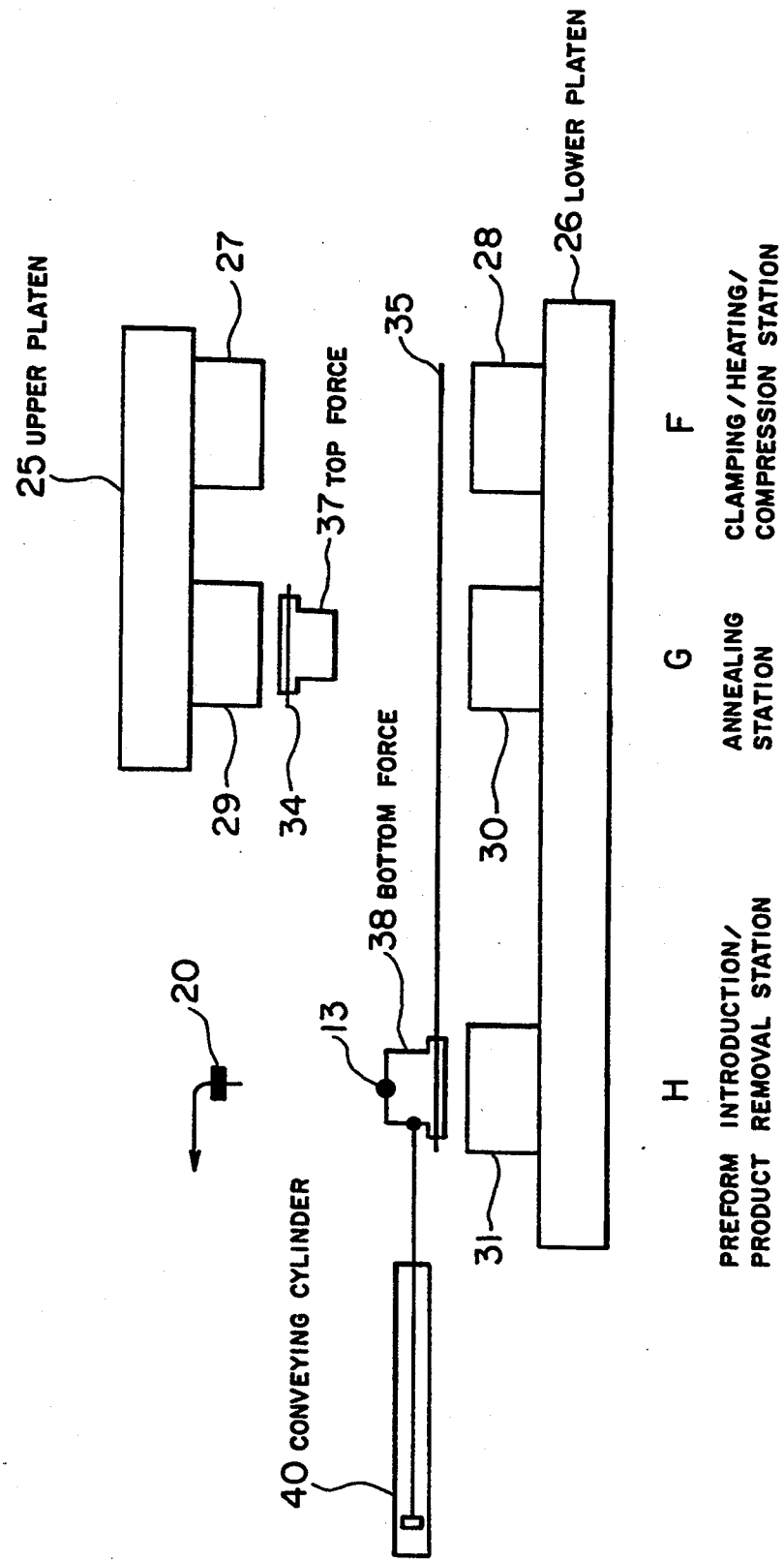
FIG. 3 is a schematic view of a first embodiment of a glass compression molding apparatus according to the present invention.

In FIG. 3, reference numeral 25 denotes an upper platen which is horizontally disposed; 26 denotes a lower platen which is disposed parallel to the upper platen 25; F denotes a clamping/heating/compression station provided on the lower platen 26; G denotes an annealing station provided adjacent to the clamping-/heating/compression station F; and H denotes a preform introduction/product removal station provided adjacent to the annealing station G.

On the upper and lower platens 25 and 26 are provided tie bars (not shown) and a clamping device (not shown). Consequently, at least one of the upper and lower platens 25 and 26 can be moved to generate a clamping force between the upper and lower platens 25 and 26.

In the clamping/heating/compression station F, an upper high-temperature hot plate 27 is provided on the upper platen 25, and a lower high-temperature hot plate 28 is provided on the lower platen 26. In the annealing station G, an upper annealing hot plate 29 is provided on the upper platen 25, and a lower annealing hot plate 30 is provided on the lower platen 26. In the preform introduction/product removal station H, a preheating hot plate 31 is provided on the lower platen 26 alone. Each of the upper high-temperature hot plate 27, the lower high-temperature hot plate 28, the upper annealing hot plate 29, the lower annealing hot plate 30 and the preheating hot plate 31 includes a cartridge heater (not shown) and is controlled to maintain temperatures required for molding.

On the upper platen 25, a pair of upper rails 34 are provided at a position corresponding to the annealing station G in such a manner that they extend horizontally and parallel to each other. On the lower platen 26, a pair of lower rails 35 are provided in such a manner that they extend horizontally and parallel to each other over the clamping/heating/compression station F, the annealing station G and the preform introduction/product removal station H. A top die 37 and a bottom die 38 are disposed in such a manner as to be movable along the upper rails 34 and the lower rails 35, respectively. The bottom die 38 is moved in the horizontal direction by a conveying cylinder 40. Reference numerals 13 and 20, respectively, denote a preform and a product. Introduction of the preform 13 is performed by placing the preform 13 on the bottom die 38 with the top die 37 spaced from the bottom die 38.

Figure 4:
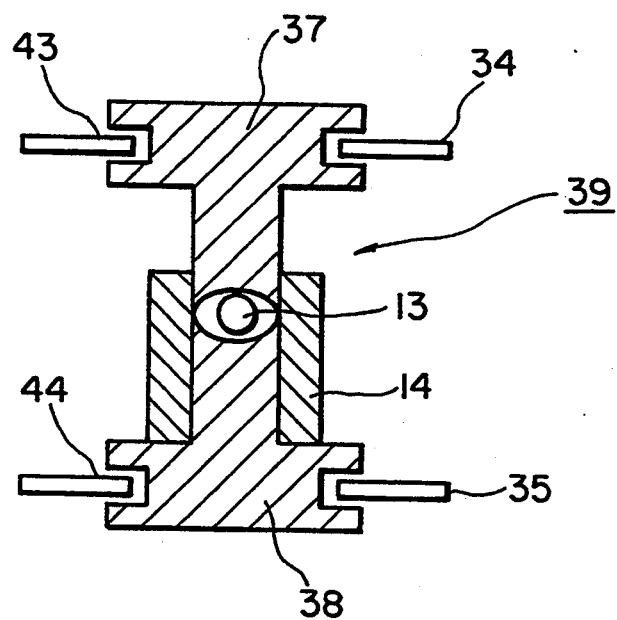
FIG. 4 is a sectional view showing how a mold 18 is supported using the apparatus of FIG. 3.
Figure 5:
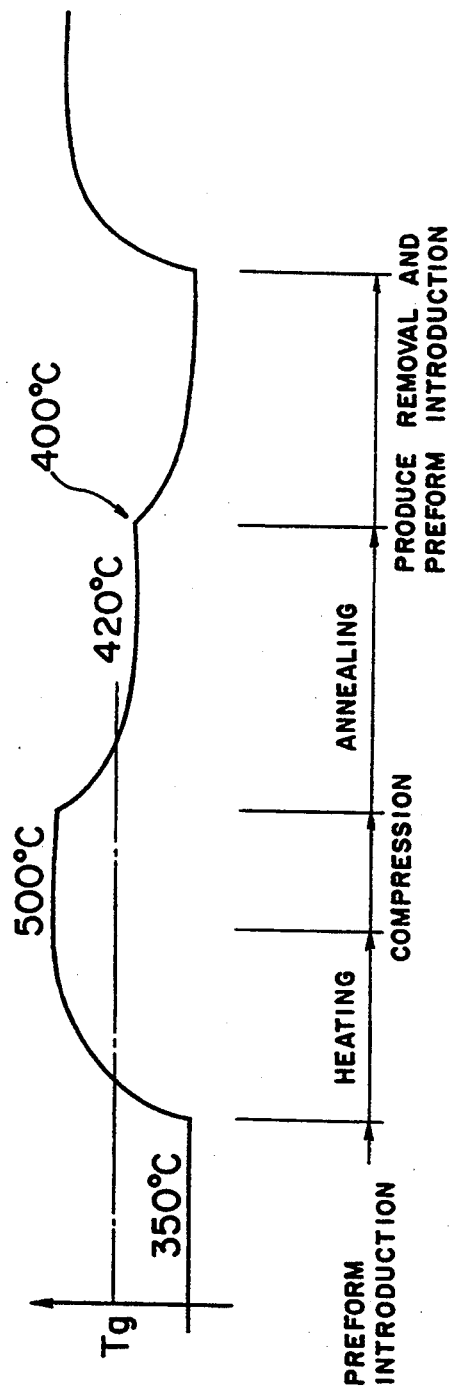
FIG. 5 is a graph showing how the temperature of the mold changes in the first embodiment of the present invention.

FIG. 4 illustrates how the mold is supported.

In FIG. 4, 13 denotes a preform; 14, a sleeve; 34, upper rails; 35, lower rails; 37, a top die; 38, a bottom die; 39, a mold.

A pair of grooves 43 are formed in the top die 37 in the longitudinal direction of the upper platen 25 (FIG. 3). Each of the upper rails 34 is inserted into the corresponding groove 43. A pair of grooves 44 are formed in the bottom die 38 in the longitudinal direction of the lower platen 26. Each of the lower rails 35 is inserted into the corresponding groove 44.

Figure 1:
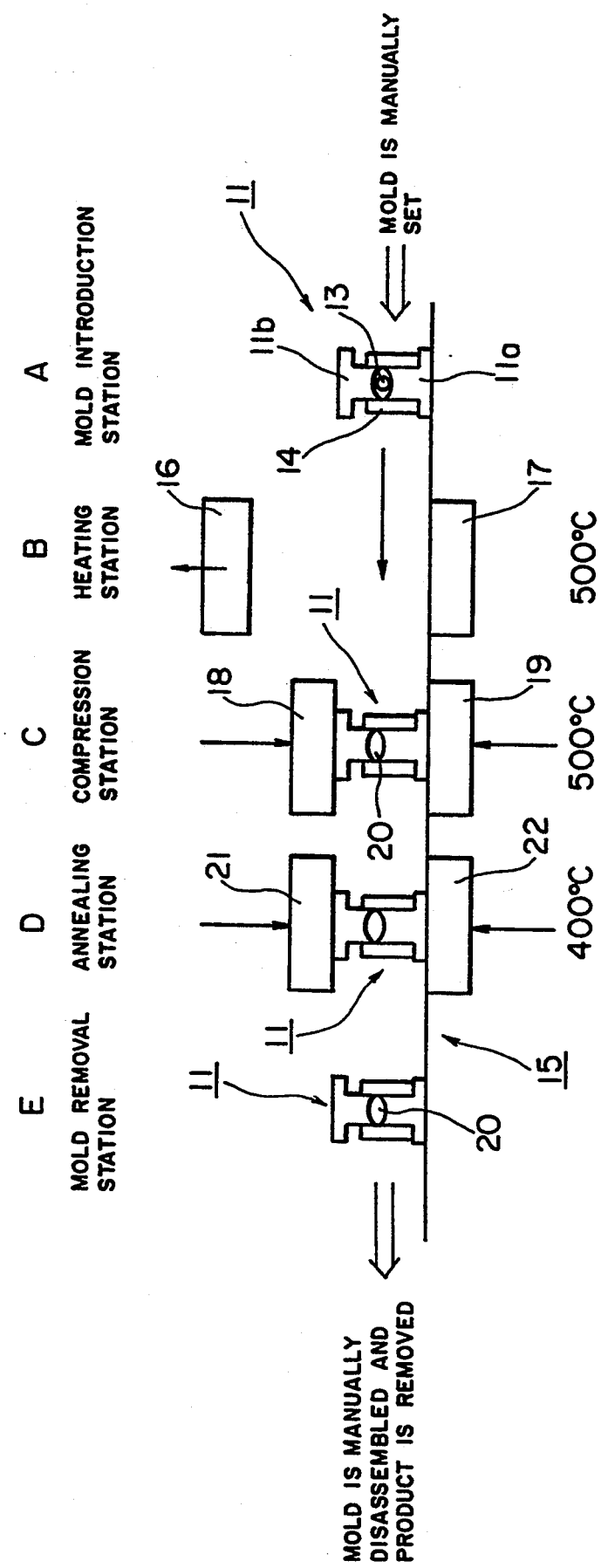
FIG. 1 is a schematic of a conventional glass compression molding apparatus.
Figure 2:
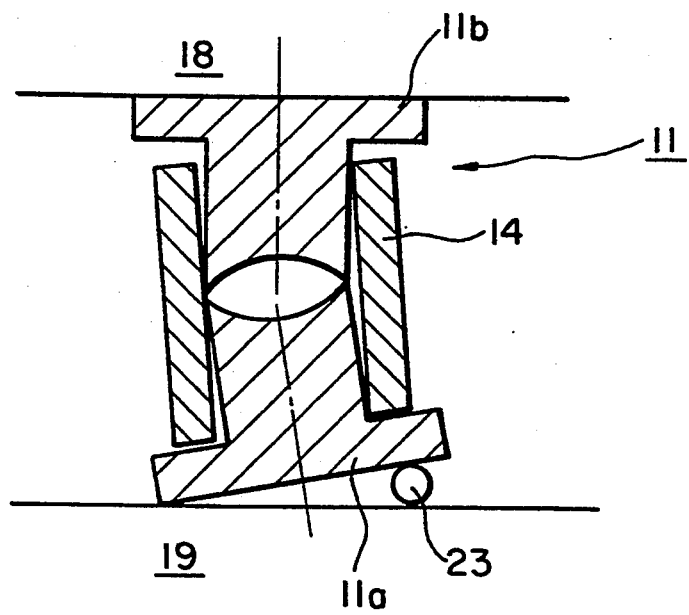
FIG. 2 is a sectional view of a mold in the conventional glass compression molding apparatus.

Both the upper and lower rails 34 and 35 are movable up and down by a small distance, for example, by 1 mm. Therefore, inclination of the bottom die 38 due to the presence of the foreign matter 23 (see FIG. 2) is eliminated, improving the dimensional accuracy of the product 20.

The sleeve 14 is fitted to the bottom die 38 in a mold open state. The top die 37 moves up and down guided by the sleeve 14 and is thereby brought into contact with and separated from the bottom die 38.

In this embodiment, the lower rails 35 disposed in such a manner that they face the lower platen 26 and are movable up and down. However, the conveying cylinder 40 may be made movable up and down in order to move the bottom die 38 up and down directly without using the lower rails 35.

The operation of the first embodiment of the glass compression molding apparatus according to the present invention will be described below.

Figure 6:
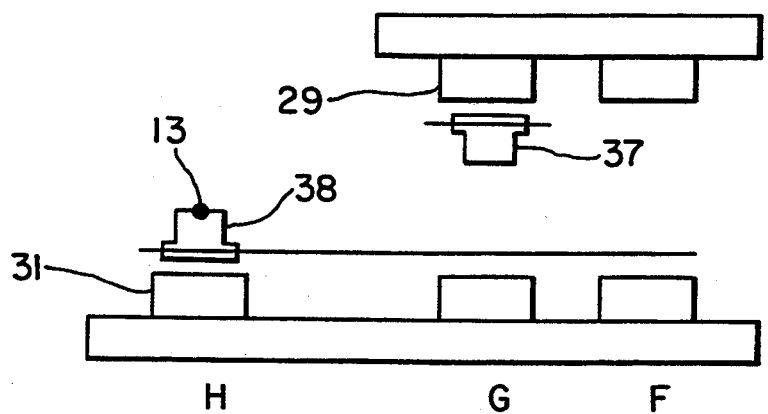
FIGS. 6, 7 and 8 are schematic diagrams illustrating preform introduction in the first embodiment of the glass compression molding apparatus according to the present invention.
Figure 7:
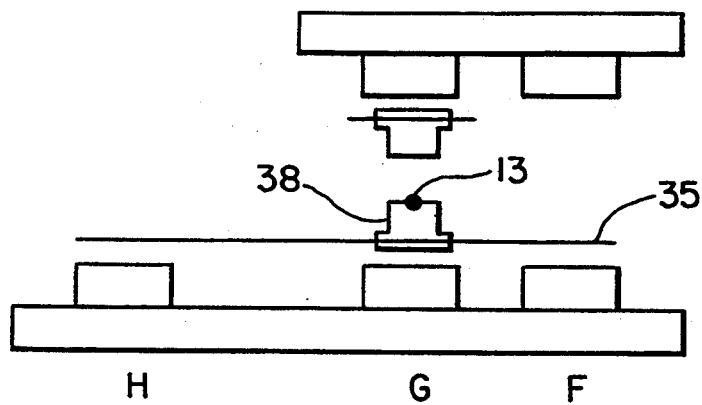
Figure 8:
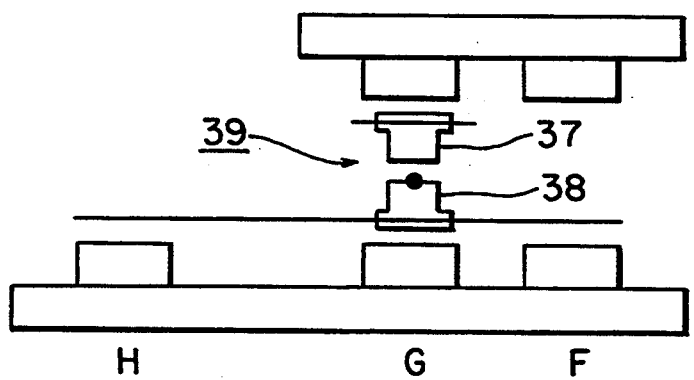

Referring to FIG. 6, the top die 37 is located in the annealing station G at a position directly under the upper annealing hot plate 29, and the bottom die 38 is located in the preform introduction/product removal station H at a position directly above the preheating hot plate 31. The preform 13 is placed on the bottom die 38 and the bottom die 38 is preheated to a temperature of 350° C., and the preform 13 is slightly preheated to a temperature of 200° C. After the preform 13 has been preheated on the bottom die 38, the bottom die 38 is moved to the annealing station G suspended by the lower rails 35 a small distance above the lower platen, as shown in FIG. 7. In the annealing station G, the top die 37 is brought into register with the bottom die 38 to form the mold 39, as shown in FIG. 8. At that time, the top and bottom dies 37 and 38 are merely brought into register with each other and are not clamped.

Figure 9:
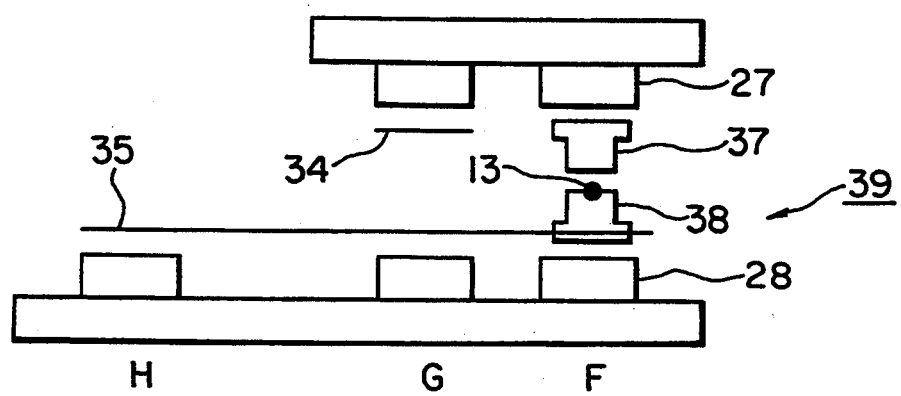
FIGS. 9, 10 and 11 are schematic diagrams illustrating the clamping, heating and compression steps using the first embodiment of the glass compression molding apparatus according to the present invention.

Thereafter, the mold 39 is moved to the clamping/heating/compression station F suspended by the lower rails 35. For this movement to station F, the top die 37 is removed from the upper rails 34. In the clamping/heating/compression station F, the top die 37 is located at a position directly under the upper high-temperature hot plate 27, and the bottom die 38 is located at a position directly above the lower high-temperature hot plate 28, as shown in FIG. 9. Subsequently, the upper platen 25 is lowered by a clamping device (not shown) for clamping. After clamping the dies 37 and 38 together as mold 39, a large amount of heat is transmitted directly from the upper and lower high-temperature hot plates 27 and 28 to heat the mold 39 to 500° C.

If the diameter of the preform 13 is about 10 mm, the dimensions of the mold 39 are 30×40 mm at the most. Therefore, the mold 39 gripped between the upper and lower high-temperature hot plates 27 and 28 is rapidly heated. It takes, for example, only 1 minute for the mold 39 to be heated to 100° C.

Figure 10:
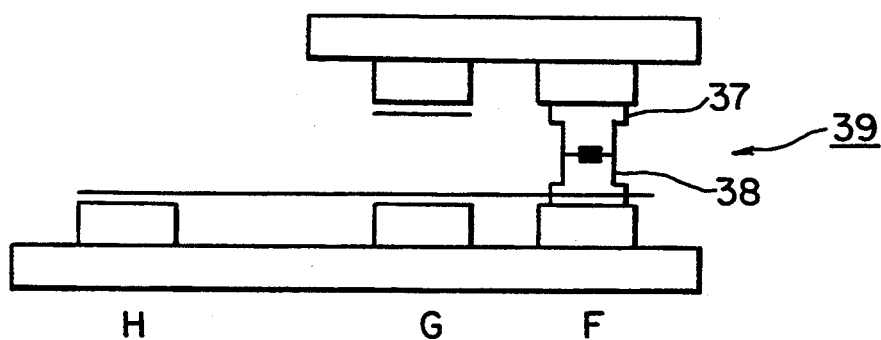

When the preform 13 has been softened, a core compressing device (not shown) is activated to generate a compressing force, whereby compression is initiated. Consequently, the preform 13 is compressed in the cavity of the mold 39, as shown in FIG. 10. As a result, the preform 13 copies the shape of the top and bottom dies 37 and 38 and becomes the product 20 (FIG. 3).

Figure 11:
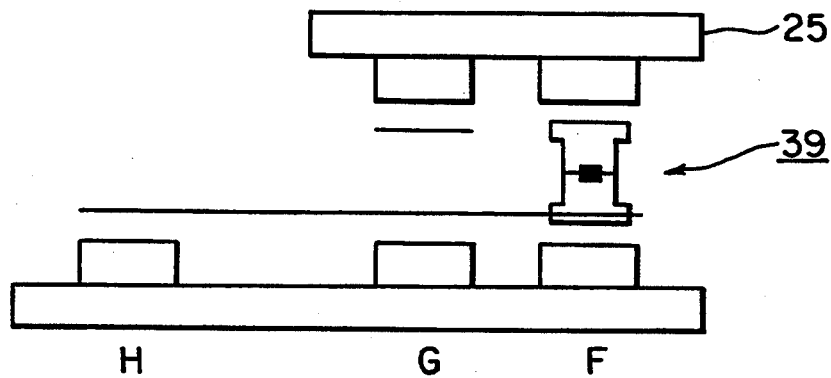
Figure 12:
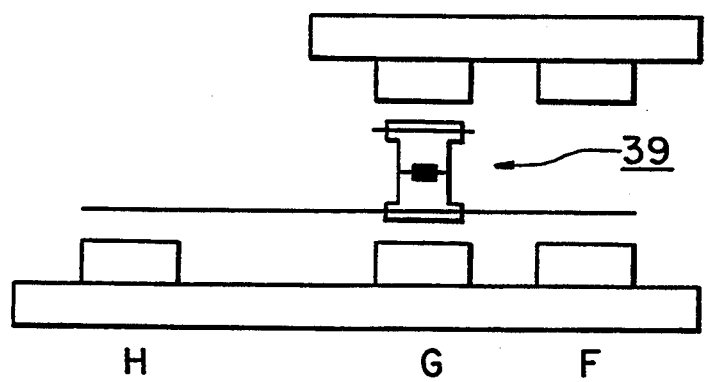
FIGS. 12, 13 and 14 are schematic diagrams illustrating second clamping and annealing steps using the first embodiment of the glass compression molding apparatus according to the present invention.
Figure 13:
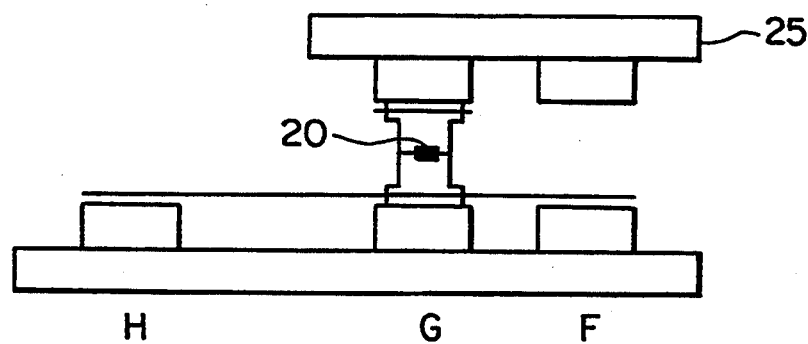

Subsequently, the upper platen 25 is moved up slightly, as shown in FIG. 11, and then the mold 39 is moved suspended to the annealing station G, as shown in FIG. 12. In the annealing station G, the mold 39 is rapidly cooled to 400° C. The upper platen 25 is then again lowered for clamping, as shown in FIG. 13. The product 20 in the cavity is cooled to a temperature equal to or lower than the glass transition point $T_g$, e.g., 420° C., and thereby completely solidified. The glass transition point $T_g$ differs depending on the material, generally ranging from 350° to 600° C.

Figure 14:
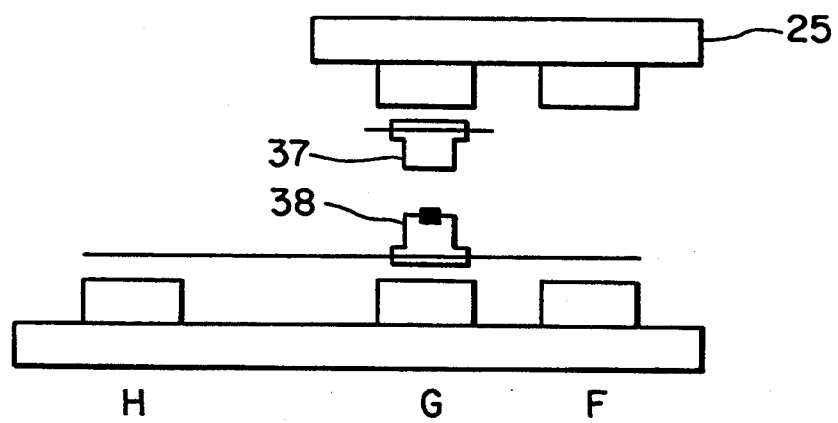
Figure 15:
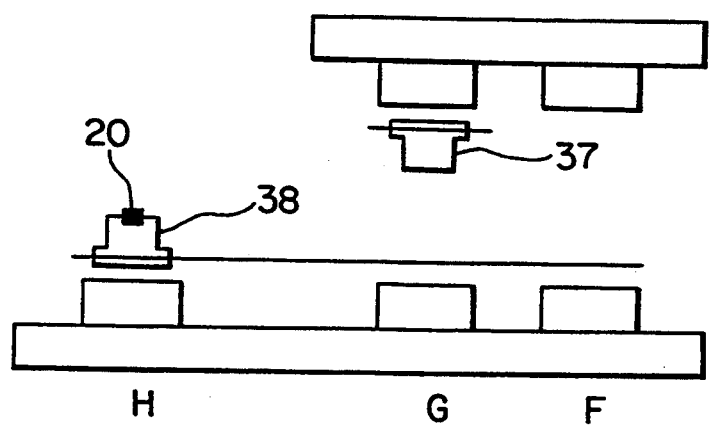
FIGS. 15 and 16 are schematic diagrams illustrating product removal using the first embodiment of the glass compression molding apparatus according to the present invention.
Figure 16:
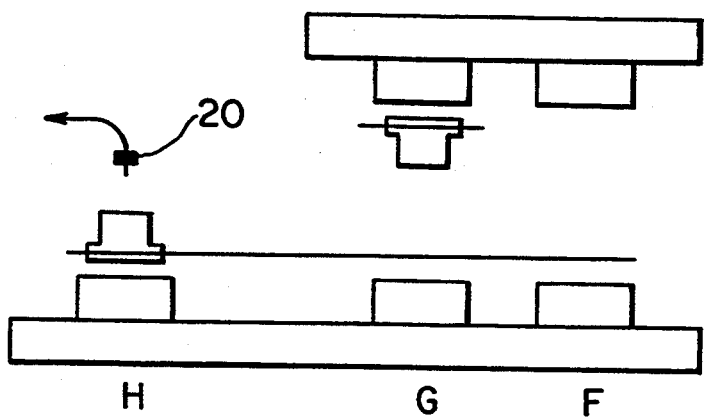

Thereafter, the upper platen 25 is raised to separate the top and bottom dies 37 and 38 from each other, as shown in FIG. 14. As shown in FIGS. 15 and 16, only the bottom die 38 is moved suspended to the preform introduction/product removal station H, and the product 20 is removed from the bottom die 38 by a robot or the like (not shown).

After the mold has been opened, the top die 37 remains in the annealing station G to facilitate the removal of the product 20 and placement of the preform 13 for subsequent molding.

A second embodiment of the present invention will be described below with reference to FIG. 17.

Figure 17:
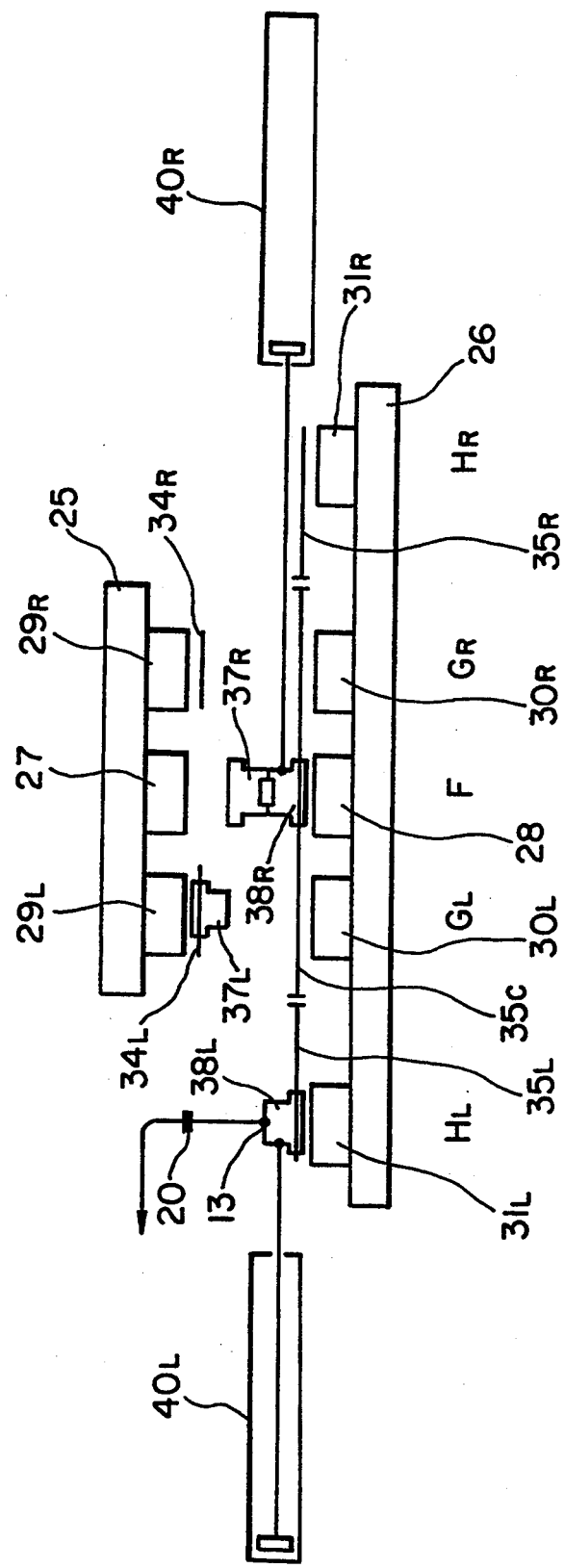
FIG. 17 is a schematic view of a second embodiment of the glass compression molding apparatus according to the present invention.
Figure 18:
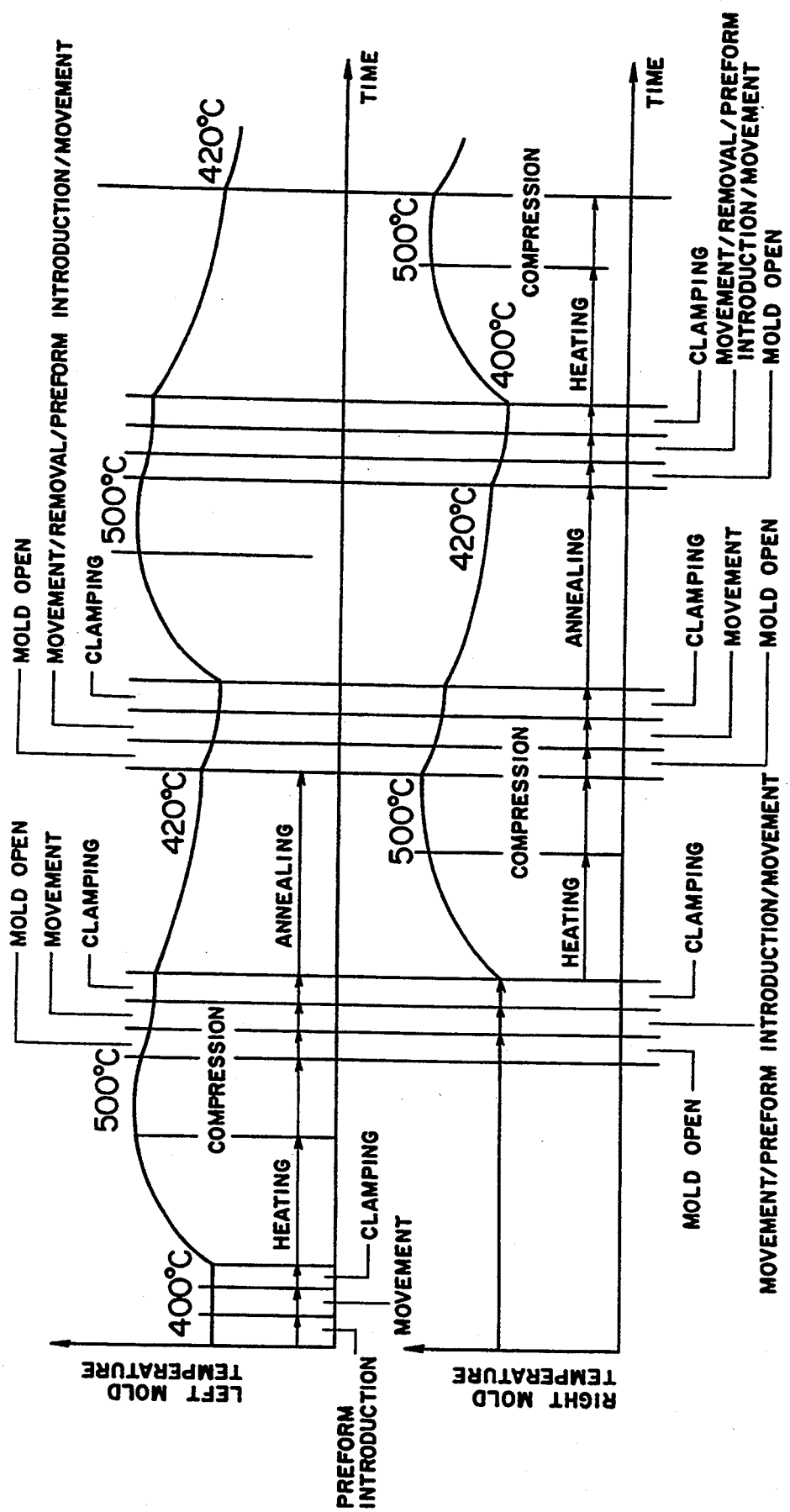
FIG. 18 is a graph showing how the temperature of the mold changes in the second embodiment of the present invention.

In FIG. 17, reference numeral 25 denotes an upper platen; 26, a lower platen; F, a clamping/heating/compression station provided on the lower platen 26; $G_L$, a left annealing station provided adjacent to the clamping/heating/compression station F; $G_R$, a right annealing station provided adjacent to the clamping/heating/compression station F; $H_L$, a left preform introduction/product removal station; and $H_R$, a right preform introduction/product removal station.

On the upper and lower platens 25 and 26 are provided tiebars (not shown) and a clamping device (not shown). Consequently, a clamping force can be applied between the upper and lower platens 25 and 26 by moving at least one of the upper and lower platens 25 and 26.

In the clamping/heating/compression station F, an upper high-temperature hot plate 27 is provided on the upper platen 25, and a lower high-temperature hot plate 28 is provided on the lower platen 26. In the left annealing station $G_L$, an upper left annealing hot plate $29_L$ is provided on the upper platen 25, and a lower left annealing hot plate $30_L$ is provided on the lower platen 26. In the right annealing station $G_R$, an upper right annealing hot plate $29_R$ is provided on the upper platen 25, and a lower right annealing hot plate $30_R$ is provided on the lower platen 26. In the left preform introduction/product removal station $H_L$, a left preheating hot plate $31_L$ is provided only on the lower platen 26. In the right preform introduction/product removal station $H_R$, a right preheating hot plate $31_R$, is provided only on the lower platen 26.

Each of the upper high-temperature hot plate 27, the lower high-temperature hot plate 28, the upper left annealing hot plate $29_L$, the upper right annealing hot plate $29_R$, the lower left annealing hot plate $30_L$, the lower right annealing hot plate $30_R$, the left preheating hot plate $31_L$ and the right preheating hot plate $31_R$ includes a cartridge heater (not shown), and is controlled to maintain a temperature suitable for molding.

On the upper platen 25, a pair of left upper rails $34_L$ are provided at a position corresponding to the left annealing station $G_L$ in such a manner that they extend horizontally and parallel to each other, and a pair of right upper rails $34_R$ are provided at a position corresponding to the right annealing station $G_R$ in such a manner that they extend horizontally and parallel to each other. On the lower platen 26, a pair of parallel central lower rails $35_c$ extend horizontally over the clamping/heating/compression station F, the left annealing station $G_L$ and the right annealing station $G_R$. A pair of left lower parallel rails $35_L$ extend along the left preform introduction/product removal station $H_L$ and a pair of right lower parallel rails $35_R$ extend horizontally along the right preform introduction/product removal station $H_R$.

A left top die $37_L$ is movable along the left upper rails $34_L$, and a right top die $37_R$ is movable along the right upper rails $34_R$. A left bottom die $38_L$ is movable along the left lower rails $35_L$ and the central lower rails $35_c$, and a right bottom die $38_R$ is movable along the right lower rails $35_R$ and the central lower rails $35_c$.

The central lower rails $35_c$, the left lower rails $35_L$ and the right lower rails $35_R$ are movable up and down by a small distance, for example, 1 mm so that, when the central lower rails $35_c$ are raised, the left and right lower rails $35_L$ and $35_R$ can be raised to the same level as that of the central lower rails $35_c$. Furthermore, the right and left upper rails $34_R$ and $34_L$ are also movable up and down by a small distance, for example, 1 mm.

The left bottom die $38_L$ and the right bottom die $38_R$ are moved horizontally by a left conveying cylinder $40_L$ and a right conveying cylinder $40_R$, respectively. Reference numerals 13 and 20 respectively denote a preform and a product. Introduction of the preform 13 is performed by placing the preform 13 on the left bottom die $38_L$ or on the right bottom die $38_R$ when the left top and bottom dies $37_L$ and $38_L$ or the right top and bottom dies $37_R$ and $38_R$ are open. When the upper platen 25 is slightly raised, the left top and bottom dies $37_L$ and $38_L$ can be moved between the clamping/heating/compression station F and the left annealing station $G_L$ while in registration and the right top and bottom dies $37_R$ and $38_R$ can be moved between the clamping/heating/compression station F and the right annealing station $G_R$ in registration.

Figure 19:
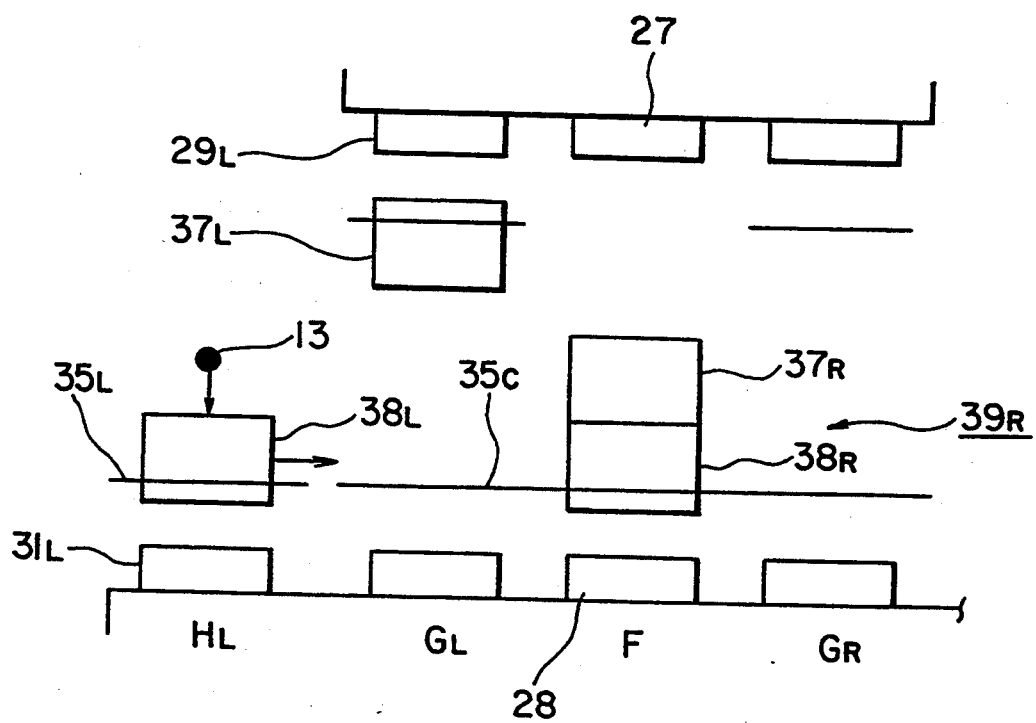
FIGS. 19–25 are schematic diagrams which illustrate the various manufacturing steps using the second embodiment of the glass compression molding apparatus according to the present invention.

In FIG. 19, the left top die $37_L$ is located at a position directly below the upper left annealing hot plate $29_L$ in the left annealing station $G_L$, and the left bottom die $38_L$ is located at a position directly below the left preheating hot plate $31_L$ in the left preform introduction/product removal station $H_L$. The preform 13 is placed on the left bottom die $38_L$. The right top die $37_R$ is located at a position corresponding to the upper high-temperature hot plate 27 in the clamping/heating/compression station F, and the right bottom die $38_R$ is located at a position directly above the lower high-temperature hot plate 28 in the clamping/heating/compression station F. After compression of a right mold $39_R$, the left bottom die $38_L$ is moved along the left lower rails $35_L$ and the central lower rails $35_c$ from the left preform introduction/product removal station $H_L$ to the left annealing station $G_L$.

Figure 20:
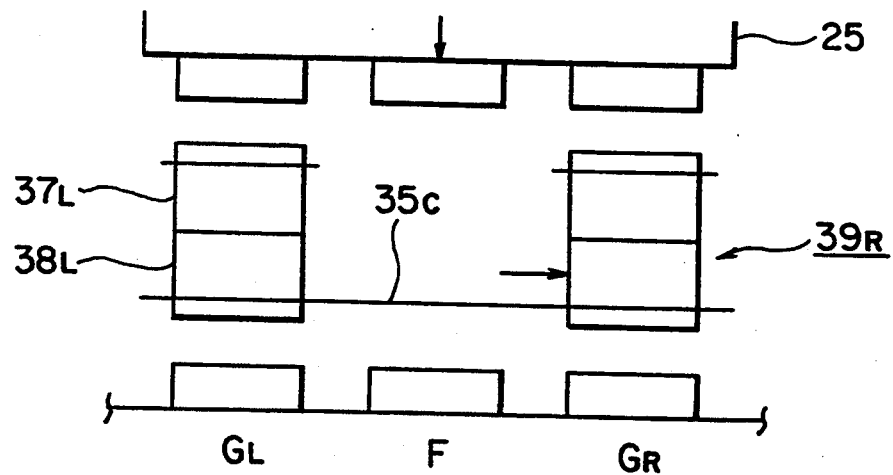

As shown in FIG. 20, the right mold $39_R$ is moved along the central lower rails $35_c$ from the clamping/heating/compression station F to the right annealing station $G_R$ and then stopped at the right annealing station $G_R$ temporarily. At that time, the upper platen 25 is moved down so as to bring the left top and bottom dies $37_L$ and $38_L$ into registration with each other.

Figure 21:
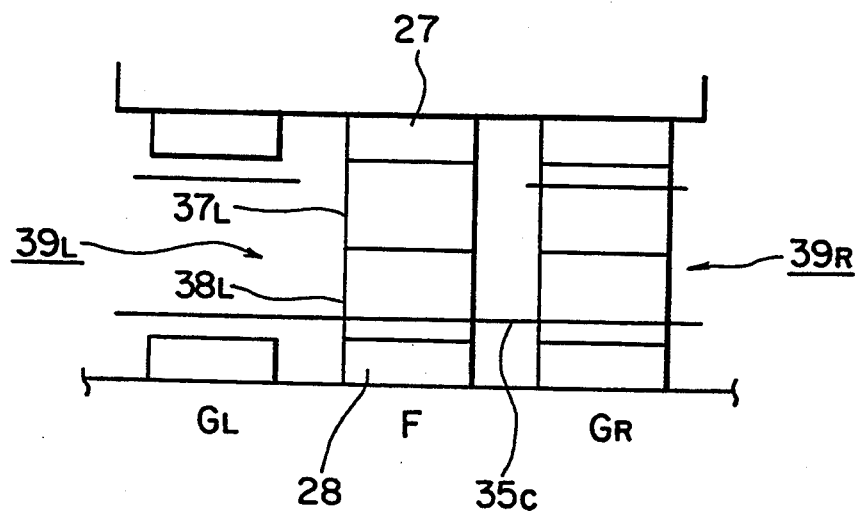

In FIG. 21, a left mold $39_L$ is moved along the central lower rails $35_c$ from the left annealing station $G_L$ to the clamping/heating/compression station F, and then clamped by the clamping device (not shown). A large amount of heat is transmitted directly from the upper and lower high-temperature hot plates 27 and 28 to the left mold $39_L$ to rapidly heat the left mold $39_L$. When the preform 13 (FIG. 19) has been softened, a core compressing device (not shown) is activated to generate a compressive force, whereby compression is started. During the compression process, the preform 13 is compressed in the cavity of the left mold $39_L$ whereby the preform accurately conforms to the shape of the left top and bottom dies $37_L$ and $38_L$ and becomes the product 20 (FIG. 17).

The product in the right mold $39_R$ is annealed in the right annealing station $G_R$.

Figure 22:
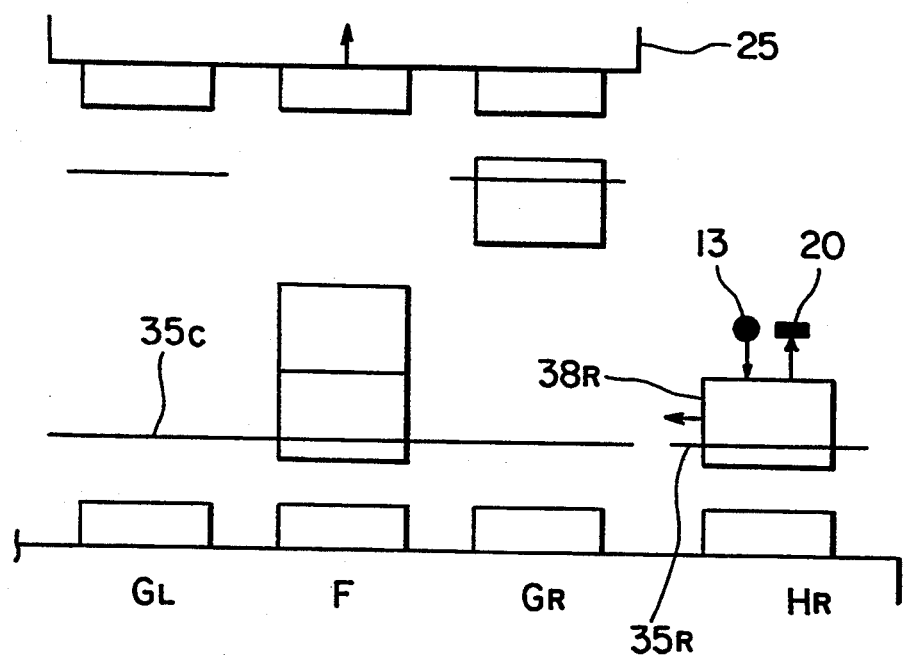

In FIG. 22, the upper platen 25 is moved up to open the right mold $39_R$ (FIG. 21), and then the right bottom die $38_R$ is moved along the central lower rails $35_c$ and the right lower rails $35_R$ from the right annealing station $G_R$ to the right preform introduction/product removal station $H_R$. In the right preform introduction/product removal station $H_R$, the product 20 is removed, and a subsequent preform 13 is introduced. Thereafter, the right bottom die $38_R$ is moved along the right lower rails $35_R$ and the central lower rails $35_c$ from the right preform introduction/product removal station $H_R$ to the right annealing station $G_R$.

Figure 23:
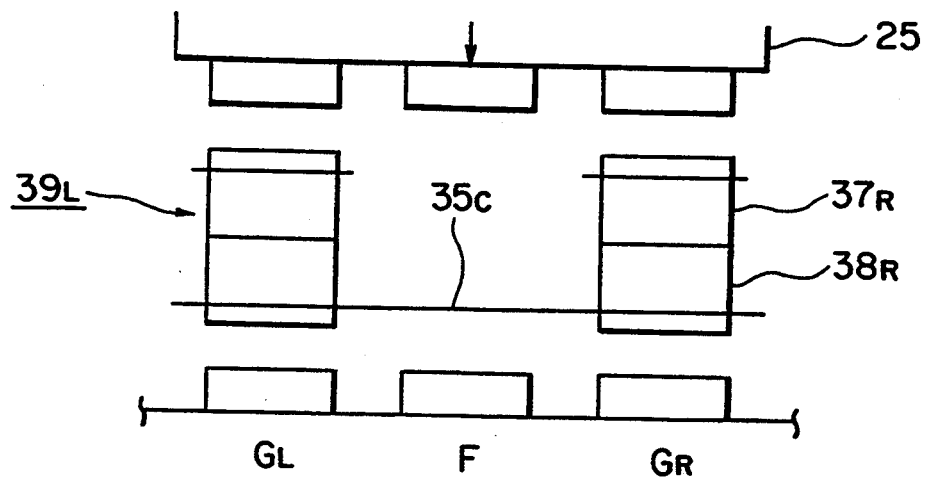

As shown in FIG. 23, the upper platen 25 is moved down to bring the right top and bottom dies $37_R$ and $38_R$ into registration with each other, and the left mold $39_L$ is moved along the central lower rails $35_c$ from the clamping/heating/compression station F to the left annealing station $G_L$.

Figure 24:
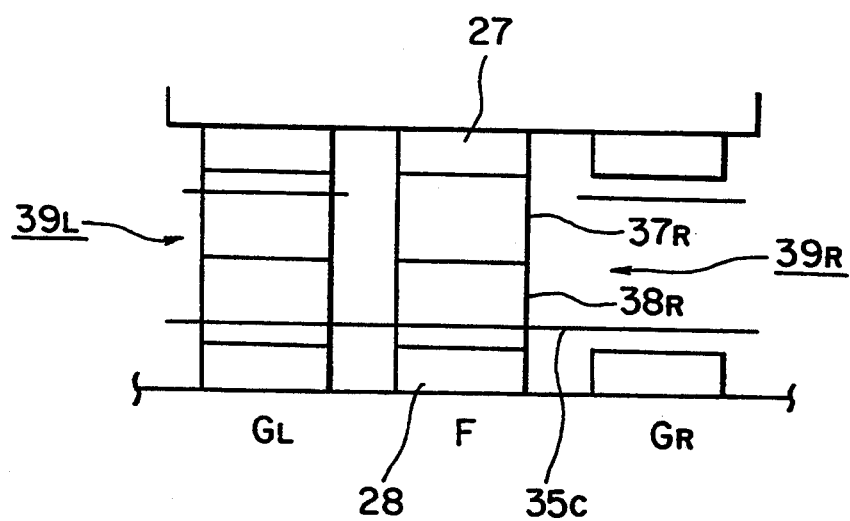

As shown in FIG. 24, the right mold $39_R$ is moved along the central lower rails $35_c$ from the right annealing station $G_R$ to the clamping/heating/compression station F, and then clamped by the clamping device (not shown). A large amount of heat is transmitted directly from the upper and lower high-temperature hot plates 27 and 28 to the right mold $39_R$ to rapidly heat the right mold $39_R$. When the preform 13 (FIG. 22) has been softened, the core compressing device (not shown) is activated to generate a compressive force, whereby compression is initiated. During the compression process, the preform 13 is compressed in the cavity of the right mold $39_R$ whereby the preform 13 accurately conforms to the shape of the right top and bottom dies $37_R$ and $38_R$, and is thereby converted to the product 20 (FIG. 17).

The product in the left mold $39_L$ is annealed in the left annealing station $G_L$.

Figure 25:
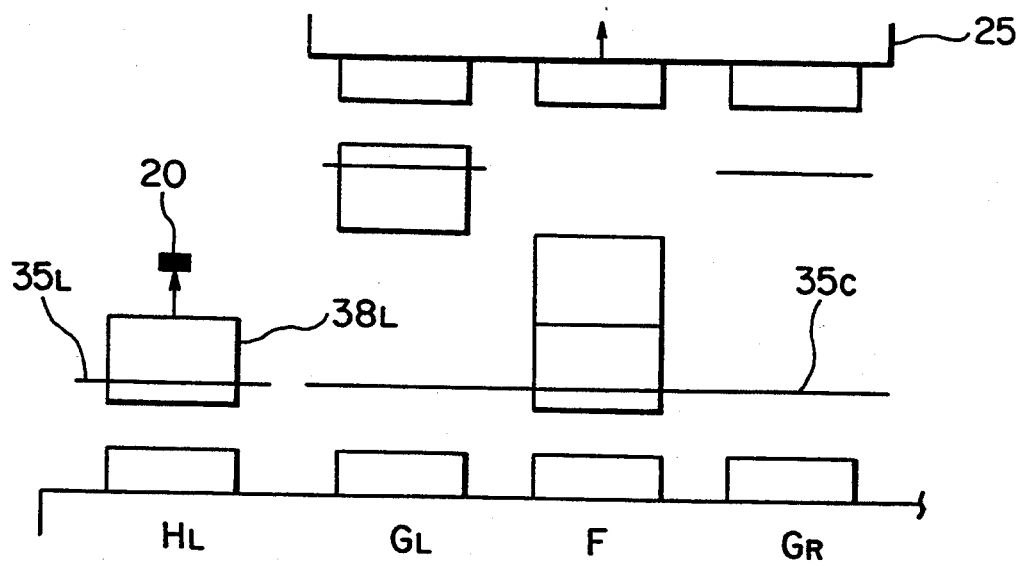

As shown in FIG. 25, the upper platen 25 is moved up to open the left mold $39_L$ (FIG. 24), and then the left bottom die $38_L$ is moved along the central lower rails $35_c$ and the left lower rails $35_L$ from the left annealing station $G_L$ to the left preform introduction/product removal station $H_L$. In the left preform introduction/product removal station $H_L$ the product 20 is removed, and a subsequent preform 13 is introduced (FIG. 19), if necessary.

In order to automatically perform the operations in the preform introduction/product removal stations H, $H_L$, $H_R$, the annealing stations G, $G_L$, $G_R$ and the clamping/heating/compression station F, one mold 39 is employed in the first embodiment while two molds $39_L$ and $39_R$ are employed in the second embodiment.

The conventional glass compression molding apparatus requires a large number of molds 11 (see FIG. 2), e.g. 10 molds. Therefore, the accuracy of the products 20 is affected by variations in the dimensions of the individual molds 11 or in the maintenance thereof, and it is thus difficult to provide consistent quality. In the present invention, however, since the single mold 39 or the two molds $39_L$ and $39_R$ are used, the production cost can be reduced while the quality of the products 20 can be consistent.

In the conventional glass compression molding apparatus, it takes fifteen minutes for a product 20 to be obtained from a preform 13. The use of a large number of molds 11 enables the products 20 to be manufactured at a rate of one product per five minutes. In the first embodiment, it takes eight minutes for a product 20 to be obtained from a preform 13. The use of one mold 39 enables the products 20 to be manufactured at a rate of one product 20 per four minutes.

In the second embodiment, it takes four minutes for a product 20 to be obtained from a preform 13. The use of two molds $39_L$ and $39_R$ enables the products 20 to be manufactured at a rate of one product per two minutes.

A third embodiment of the glass compression molding apparatus according to the present invention will be described below.

Figure 26:
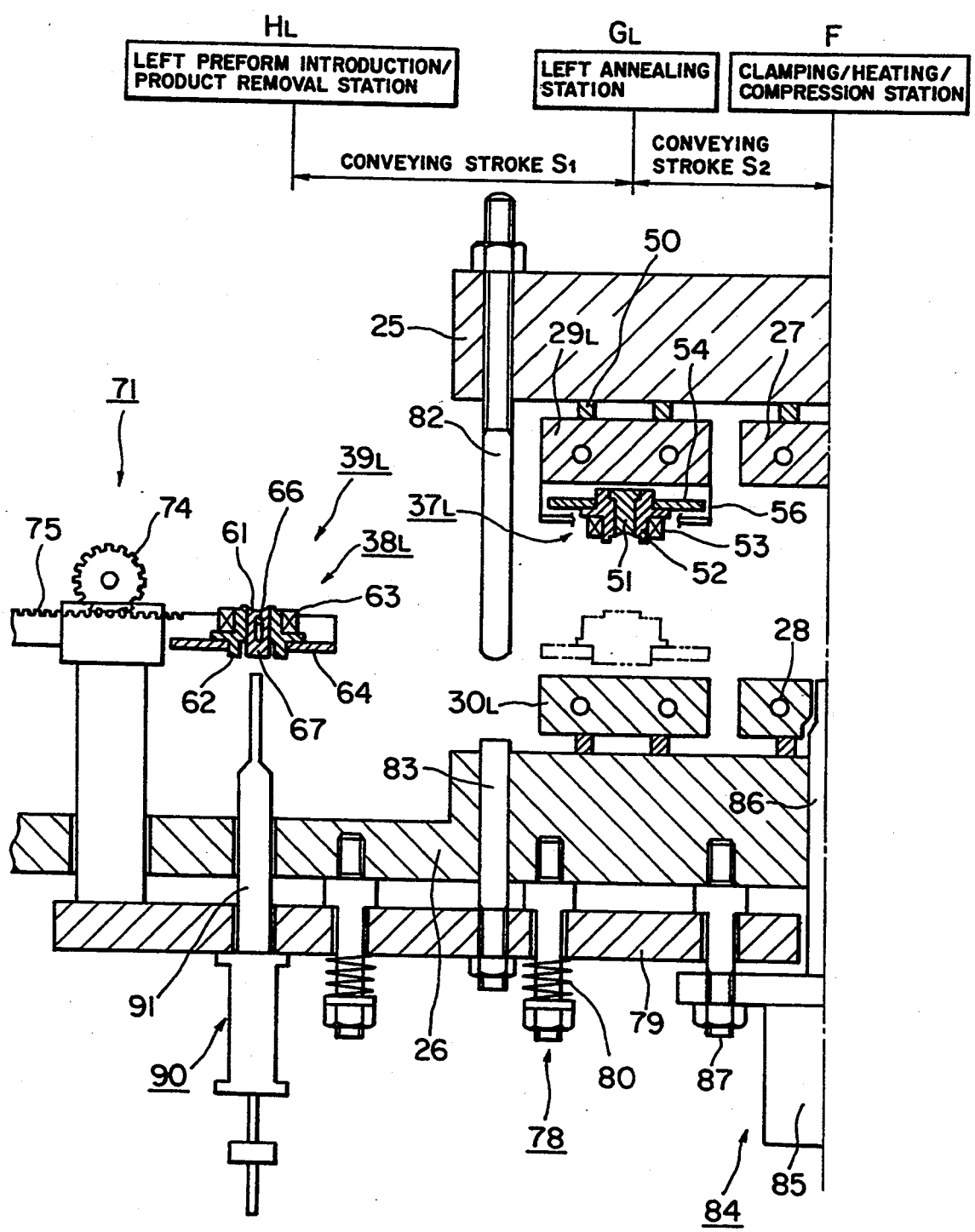
FIG. 26 is a longitudinal cross-sectional view of the left side of a third embodiment of the glass compression molding apparatus according to the present invention.
Figure 27:
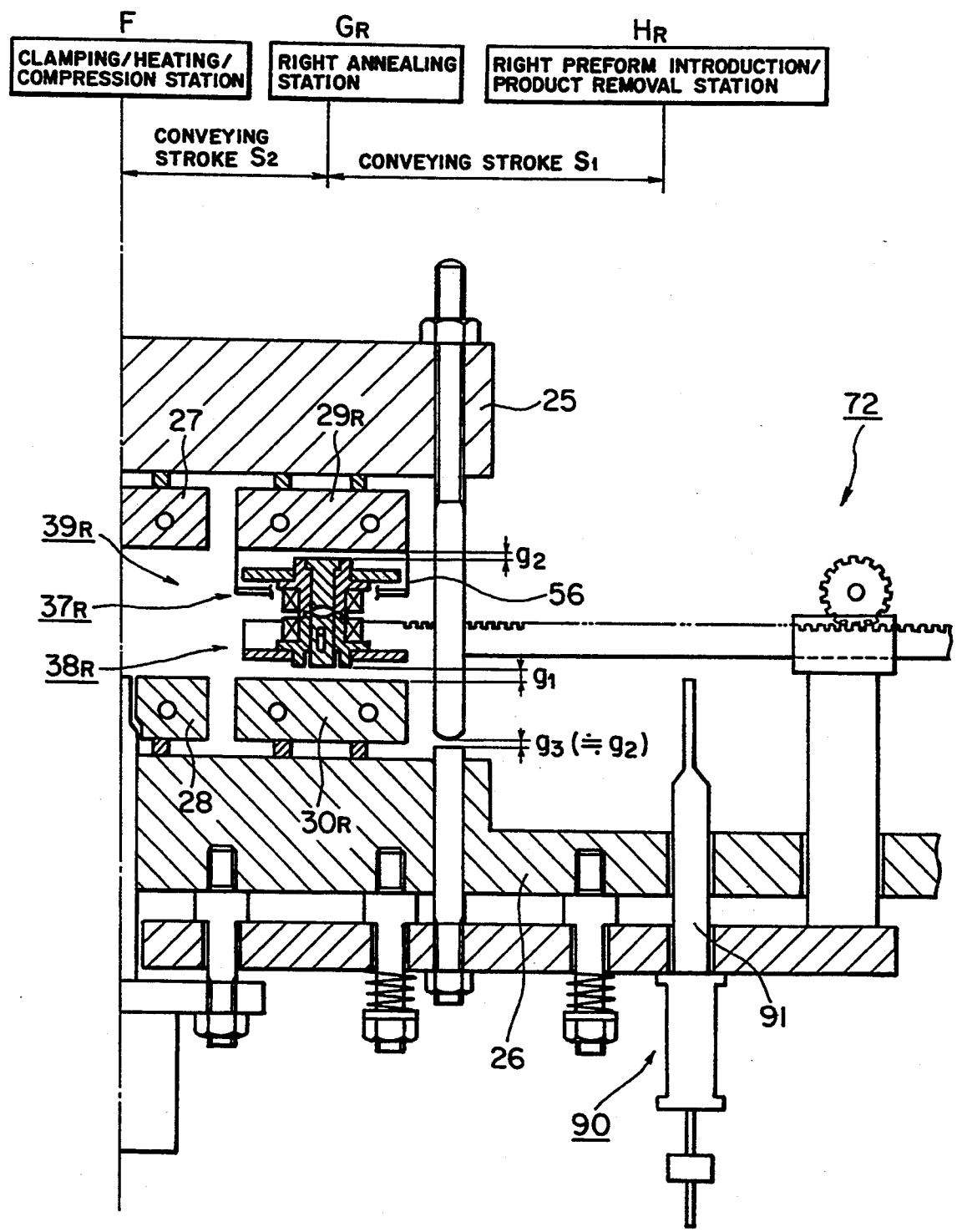
FIG. 27 is a longitudinal cross-sectional view of the right side of the third embodiment of the glass compression molding apparatus according to the present invention.
Figure 28:
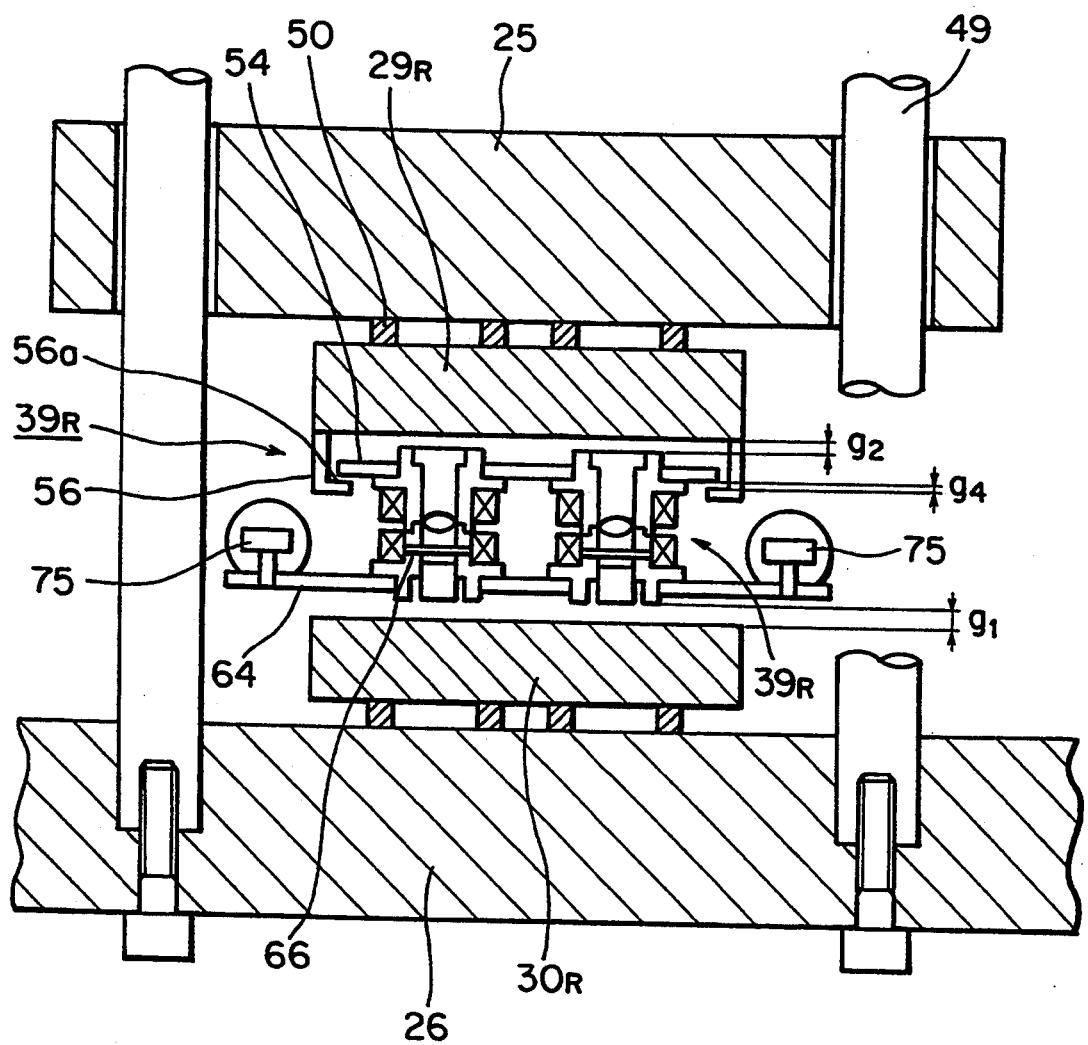
FIG. 28 is a lateral cross-sectional view of the third embodiment of the glass compression molding apparatus according to the present invention.

In FIGS. 26–28, reference numeral 25 denotes an upper platen; 26, a lower platen; F, a clamping/heating/compression station provided on the lower platen 26; $G_L$, a left annealing station provided adjacent to the clamping/heating/compression station F; $G_R$, a right annealing station provided adjacent to the clamping/heating/compression station F; $H_L$, a left preform introduction/product removal station; and $H_R$, a right preform introduction/product removal station.

A conveying stroke $S_1$ moves a left lower die $38_L$ between the left preform introduction/product removal station $H_L$ and the left annealing station $G_L$ and another conveying stroke $S_1$ moves a right lower die $38_R$ between the right preform introduction/product removal station $H_R$ and the right annealing station $G_R$. A conveying stroke $S_2$ moves the left lower die $38_L$ between the left annealing station $G_L$ and the clamping/heating/compression station F and another stroke $S_2$ moves the right lower die $38_R$ between the right annealing station $G_R$ and the clamping/heating/compression station F.

Tie bars 49 are provided between the lower platen 26 and a clamping device support (not shown), and a clamping device (not shown) is provided between the upper platen 25 and the clamping device support (not shown). Consequently, a clamping force can be applied between the upper and lower platens 25 and 26 by moving the upper platen 25.

In the clamping/heating/compression station F, an upper high-temperature hot plate 27 is provided on the upper platen 25, and a lower high-temperature hot plate 28 is provided on the lower platen 26. In the left annealing station $G_L$, an upper left annealing hot plate $29_L$ is provided on the upper platen 25, while a lower left annealing hot plate $30_L$ is provided on the lower platen 26. In the right annealing station $G_R$, an upper right annealing hot plate $29_R$ is provided on the upper platen 25, and a lower right annealing hot plate $30_R$ is provided on the lower platen 26.

Heat-insulating rings 50 are disposed between the upper platen 25 and the upper high-temperature hot plate 27, between the upper platen 25 and the upper left annealing hot plate $29_L$, between the upper platen 25 and the upper right annealing hot plate $29_R$, between the lower platen 26 and the lower high-temperature hot plate 28, between the lower platen 26 and the lower left annealing hot plate $30_L$, and between the lower platen 26 and the lower right annealing hot plate $30_R$.

Each of the upper high-temperature hot plate 27, the lower high-temperature hot plate 28, the upper left annealing hot plate $29_L$, the upper right annealing hot plate $29_R$, the lower left annealing hot plate $30_L$ and the lower right annealing hot plate $30_R$ includes a cartridge heater (not shown), and is controlled to maintain a temperature required for molding. More specifically, the temperature of the upper and lower high-temperature hot plates 27 and 28 is set to a value higher than the glass transition point $T_g$ of the glass which is the molding material, and the temperature of the upper left and right annealing hot plates $29_L$ and $29_R$ is set to a value which is lower than the glass transition point $T_g$. The difference between these two temperatures is about 100° C.

The heat-insulating rings 50 are provided between the upper platen 25 and the upper high-temperature hot plate 27, between the upper platen 25 and the upper left annealing hot plate $29_L$, between the upper platen 25 and the upper right annealing hot plate $29_R$, between the lower platen 26 and the lower high-temperature hot plate 28, between the lower platen 26 and the lower left annealing hot plate $30_L$, and between the lower platen 26 and the lower right annealing hot plate $30_R$ in order to restrict transmission of heat to the upper and lower platens 25 and 26.

The left and right molds $39_L$ and $39_R$ are mounted along the upper and lower platens 25 and 26. The left and right molds $39_L$ and $39_R$ are selectively positioned at two points in the direction of movement.

This embodiment relates to a twin-mold type glass compression molding apparatus in which a pair of left molds $39_L$ and a pair of right molds $39_R$, are provided. Either the left or the right mold is located on the front side of the glass compression molding apparatus, and the other is located on the rear side thereof. The two left and two right molds $39_L$ and $39_R$ are supported in the same station, as shown in FIG. 28. Three or more left and right molds $39_L$ and $39_R$ may be provided in the same station.

Each of the left molds $39_L$ includes a left top die $37_L$ and a left bottom die $38_L$. Each of the right molds $39_R$ includes the right top die $37_R$ and a right bottom die $38_R$. Each of the left top dies $37_L$ and the right top dies $37_R$ includes an upper core 51, an upper cylindrical drum member 52 which surrounds the upper core 51, an electromagnetic induction coil 53 which surrounds the upper drum member 52, and a top die plate 54 fixed to the upper end of the upper drum member 52.

The bottom surface of the upper core 51 has a shape corresponding to the product 20 (FIG. 17). The upper end of the upper core 51 is supported by the upper drum member 52. The common top die plate 54 is used for all the left and right top dies $37_L$ and $38_R$. That is, all the left and right top dies $37_L$ and $37_R$ are supported by the common top die plate 54.

The left top dies $37_L$ are movable between the left annealing station $G_L$ and the clamping/heating/compression station F, and the right top dies $37_R$ are movable between the right annealing station $G_R$ and the clamping/heating/compression station F.

A pair of L-shaped rails 56 protrude downward from the bottom surface of the upper left annealing hot plate $29_L$ of the left annealing station $G_L$ and from the bottom surface of the upper right annealing hot plate $29_R$ of the right annealing station $G_R$. In the left and right annealing stations $G_L$ and $G_R$, the top die plate 54 is placed on and is caused to slide along rail surfaces 56a of the rails 56, whereby the left and right top dies $37_L$ and $37_R$ can be moved along the upper platen 25.

Each of the left and right bottom dies $38_L$ and $38_R$ includes a lower core 61, a lower cylindrical drum member 62 which surrounds the lower core 61, an electromagnetic induction coil 63 which surrounds the lower drum member 62, and a bottom die plate 64 fixed to the lower end of the lower drum member 62.

The upper surface of the lower core 61 has a shape corresponding to the product 20, and is supported by a drop-preventing pin 66. The common bottom die plate 64 is used for all the left and right bottom dies $38_L$ and $38_R$. That is, all the left and right bottom dies $38_L$ or $38_R$ are supported by the common bottom die plate 64.

The upper and lower drum members 52 and 62 mate to form a spigot joint, and can be accurately aligned. Whereas the upper core 51 is fixed to the upper drum member 52, the lower core 61 is slidable with respect to the lower drum member 62. Hence, an elongated hole 67 is formed in the lower core 61, and a retaining pin 66 is inserted into that elongated hole 67.

When the left top dies $37_L$ are moved between the left annealing station $G_L$ and the clamping/heating/compression station F and when the right top dies $37_R$ are moved between the right annealing station $G_R$ and the clamping/heating/compression station F, the upper and lower drum members 52 and 62 mate to form a spigot joint for registration.

The left bottom dies $38_L$ are movable between any combination of the left preform introduction/product removal station $H_L$, the left annealing station $G_L$ and the clamping/heating/compression station F, while the right bottom dies $38_R$ are movable between any combination of the right preform introduction/product removal station $H_R$, the right annealing station $G_R$ and the clamping/heating/compression station F.

In order to move the left and right molds $39_L$ and $39_R$ along the upper and lower platens 25 and 26, a left mold conveying device 71 is provided to the left of the glass compression molding apparatus and a right mold conveying device 72 is provided to the right thereof.

The left and right mold conveying devices 71 and 72 have the same structure, i.e., are made up of a support pole 73, a support pinion 74 supported for rotation with respect to support poles 73 and reversibly rotatable by a servo motor (not shown), and a support rod 75 having a rack formed on the upper surface thereof. The rack engages with the support pinion 74 and converts the rotational motion of the support pinion 74 into a linear motion.

There are a pair of support rods 75. One of the two support rods 75 is disposed on the front side of the glass compression molding apparatus, while the other is disposed on the rear side thereof, as shown in FIG. 28. The bottom die plate 64 is fixed to the distal ends of the support rods 75. The rack which engages with the support pinion 64 may be formed on at least one of the pair of support rods 75.

Thus, the left bottom dies $38_L$ are supported by the left mold conveying device 71 in such a manner that they can be moved between any combination of the left preform introduction/product removal station $H_L$, the left annealing station $G_L$ and the clamping/heating/compression station F. The right bottom dies $38_R$ are supported by the right mold conveying device 72 in such a manner that they can be moved between any combination of the right preform introduction/product removal station $H_R$, the right annealing station $G_R$ and the clamping/heating/compression station F.

A mold suspension mechanism 78 is provided so that the left and right molds $39_L$ and $39_R$ can be moved without interfering with the upper and lower high-temperature hot plates 27 and 28, the upper and lower left annealing hot plates $29_L$ and $30_L$, or the upper and lower right annealing hot plates $29_R$ and $30_R$.

The mold suspension mechanism 78 spaces the left and right molds $39_L$ and $39_R$ by a distance ranging from 0.5 mm to 1 mm from the upper and lower high-temperature hot plates 27 and 28, the upper and lower left annealing hot plates $29_L$ and $30_L$ and the upper and lower right annealing hot plates $29_R$ and $30_R$. The mold suspension mechanism 78 includes a suspension beam 79 and suspension springs 80. The left and right mold conveying devices 71 and 72 are fixed to the suspension beam 79 and are urged upward by the suspension springs 80.

In order to bring the left or right molds $39_L$ or $39_R$ into contact with the upper and lower high-temperature hot plates 27 and 28, while maintaining registration during clamping, upper pushing rods 82 are provided at the four corners of the upper platen 25, and lower pushing rods 83 pass through the four corners of the lower platen 26 and are fixed to the suspension beam 79. The upper and lower pushing rods 82 and 83 are located at positions where they face each other, and are brought into contact with each other upon clamping.

When the left molds $39_L$ are located in the left annealing station $G_L$ or when the right molds $39_R$ are located in the right annealing station $G_R$, the clamping device which generates a clamping force lowers the upper platen 25 so that the upper and lower drum members 52 and 62 mate to form a spigot joint for registration in order to temporarily form an intermediate stopped position.

In the intermediate stopped state, a gap $g_1$ is formed between the left bottom dies $38_L$ and the lower left annealing hot plate $30_L$ or between the right bottom dies $38_R$ and the lower right annealing hot plate $30_R$, a gap $g_2$ is formed between the left top dies $37_L$ and the upper left annealing hot plate $29_L$ or between the right top dies $37_R$ and the right annealing hot plate $29_R$, and a gap $g_4$ is formed between the top die plate 54 and the rail surfaces 56a.

As the clamping device is further operated, the gap $g_2$ disappears, and then a gap $g_3$ ($=g_2$) between the upper and lower pushing rods 82 and 83 disappears. After the gap $g_3$ has disappeared, the suspension beam 79 is pushed down against the urging force of the suspension spring 80 so as to bring the left bottom dies $38_L$ into contact with the lower left annealing hot plate $30_L$ or to bring the right bottom dies $38_R$ into contact with the lower right annealing hot plate $30_R$.

Thus, the left molds $39_L$ are gripped between the upper and lower left annealing hot plates $29_L$ and $30_L$ or the right molds $39_R$ are sandwiched between the upper and lower right annealing hot plates $29_R$ and $30_R$, and a clamping force is applied to the right or left molds, i.e. $39_R$ or $39_L$.

A core compressing device 84 is provided in the clamping/heating/compression station F below the suspension beam 79. The core compressing device 84 includes a compression rod 86 and a compression cylinder 85 which is fixed to the lower platen 26 by means of bolts 87 which pass through the suspension beam 79. The compression rod 86 protruding from the compression cylinder 85 passes through the suspension beam 79, the lower platen 26 and then the lower high-temperature hot plate 28 and opposes the lower core 61.

Consequently, after the preform 13 has been sufficiently heated in the cavity formed between the upper and lower cores 51 and 61, the core compressing device 84 is activated by the pressure application control program of a control device (not shown) to push up the lower core 61.

An ejecting device 90 is provided in each of the left and right preform introduction/product removal stations $H_L$ and $H_R$. The ejecting device 90 is mounted on the suspension beam 79, and has a rod 91 which passes through the lower platen 26 and protrudes upward. The rod 91 is disposed such that it faces the lower core 61. The rod 91 is extended, when the product 20 is to be removed, to push up the lower core 61.

The operation of the third embodiment of the glass compression molding apparatus according to the present invention will be described below.

Figure 29:
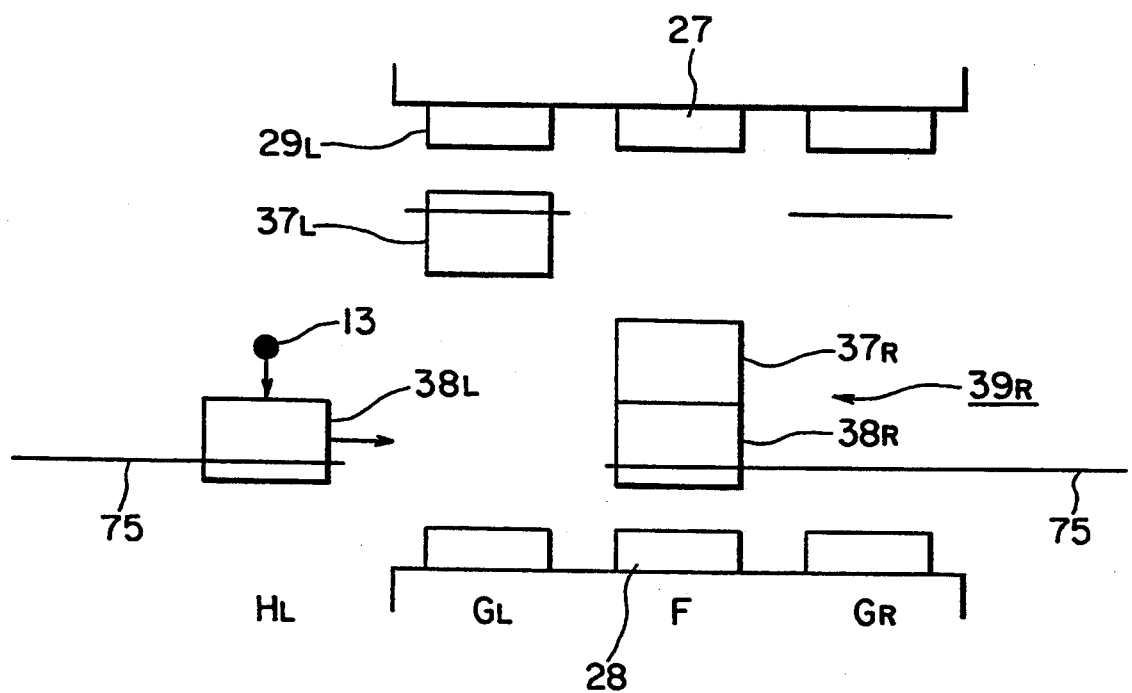
FIGS. 29–35 are schematic diagrams which illustrate the manufacturing steps utilizing the third embodiment of the glass compression molding apparatus according to the present invention.

In FIG. 29, the left top dies $37_L$ are located in the left annealing station $G_L$ at a position corresponding to the upper left annealing hot plate $29_L$, while the left bottom dies $38_L$ are located in the left preform introduction/product removal station $H_L$. Introduction of the preform 13 is performed by placing a preform 13 on each of the left bottom dies $38_L$ (on the lower core 61 (see FIG. 26)). The right top dies $37_R$ are located in the clamping/heating/compression station F directly below the upper high-temperature hot plate 27, while the right bottom dies $38_R$ are located in the clamping/heating/compression station F directly above the lower high-temperature hot plate 28. At the time compression has just been completed on the right molds $39_R$, the support rods 75 are advanced to move the left bottom dies $38_L$ from the left preform introduction/product removal station $H_L$ to the left annealing station $G_L$.

Figure 30:
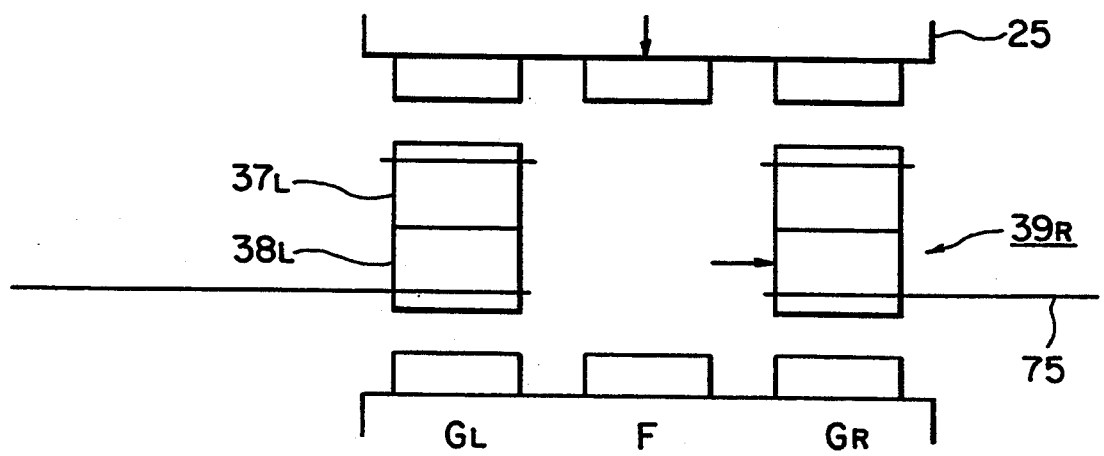

In FIG. 30, the support rods 75 are retracted to move the right molds $39_R$ from the clamping/heating/compression station F to the right annealing station $G_R$. At that time, the upper platen 25 is moved down by the clamping device (not shown) and to the intermediate stopped position so as to bring the left top and bottom dies $37_L$ and $38_L$ together.

Figure 31:
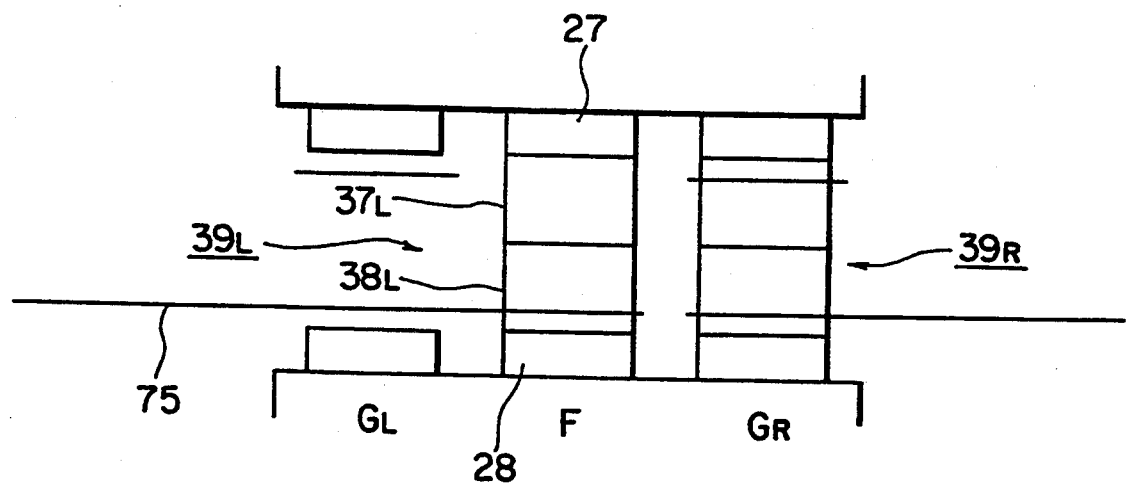

In FIG. 31, the support rods 75 are advanced to move the left molds $39_L$ to the clamping/heating/compression station F. The left molds $39_L$ are clamped by the clamping device (not shown). At that time, a large amount of heat is transmitted directly from the upper and lower high-temperature hot plates 27 and 28 to the left molds $39_L$ to rapidly heat the left molds $39_L$. When the preforms 13 (FIG. 29) have been softened, the core compressing device 84 (FIG. 26) is activated to push up the lower cores 61, whereby compression is initiated. During the compression process, the preforms 13 are compressed in the cavities of the left molds $39_L$ to conform to the shape of the left top and bottom dies $37_L$ and $38_L$.

The right molds $39_R$ are annealed in the right annealing station $G_R$.

Figure 32:
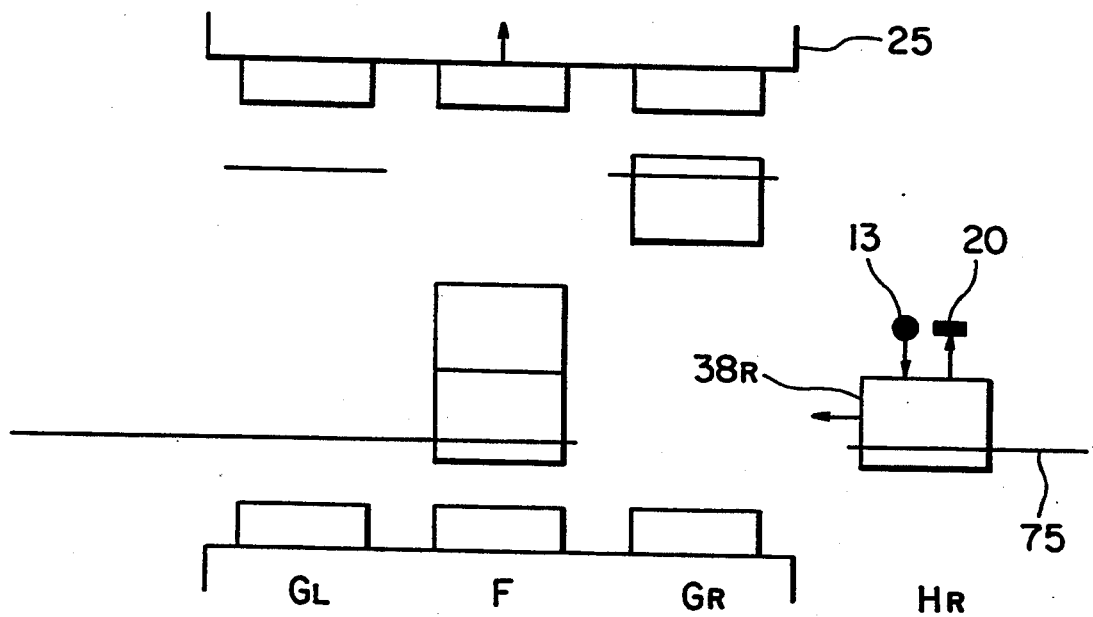

In FIG. 32, the upper platen 25 is moved up to open the right molds $39_R$ (FIG. 31), and the support rods 75 are retracted to move the right bottom dies $38_R$ from the right annealing station $G_R$ to the right preform introducing/product removal station $H_R$. In the right preform introduction/product removal station $H_R$, the ejecting device 90 (FIG. 27) is activated to push up the lower cores 61. Consequently, the products 20 are removed and new preforms 13 are introduced. Thereafter, the support rods 75 are advanced to move the right bottom dies $38_R$ from the right preform introduction/product removal station $H_R$ to the right annealing station $G_R$.

Figure 33:
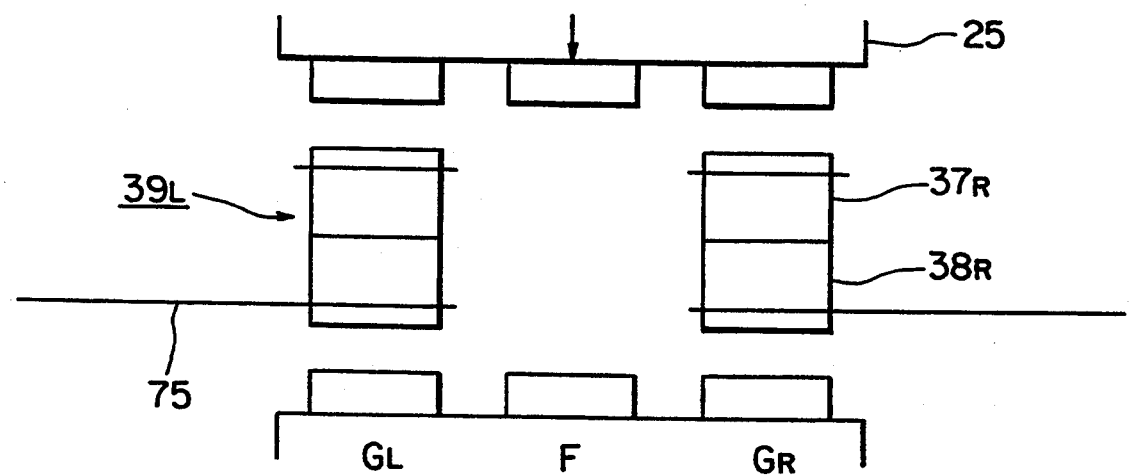

In FIG. 33, the clamping device (not shown) lowers the upper platen 25 and locates it at the intermediate stopped position, whereby the right top and bottom dies $37_R$ and $38_R$ are brought together. At that time, the support rods 75 are retracted to move the left molds $39_L$ to the left annealing station $G_L$.

Figure 34:
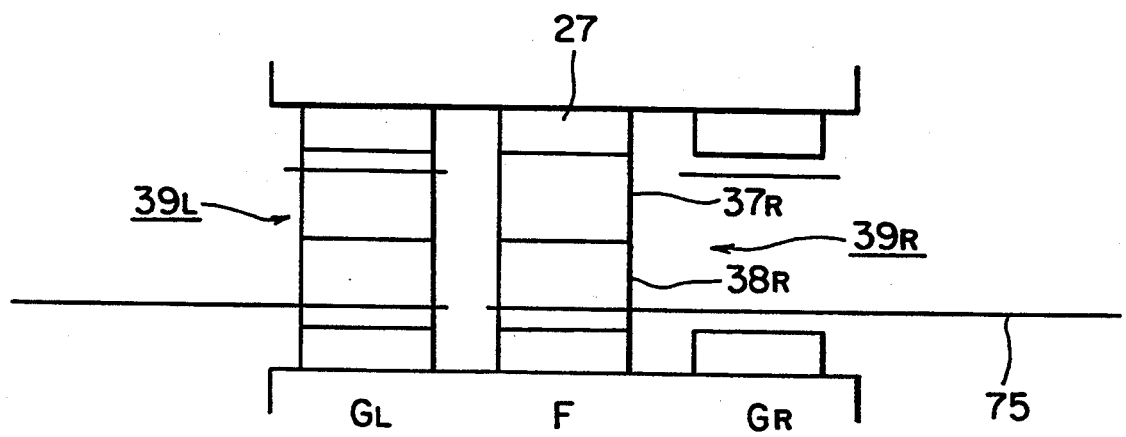

In FIG. 34, the support rods 75 are advanced to move the right molds $39_R$ from the right annealing station $G_R$ to the clamping/heating/compression station F. The right molds $39_R$ are clamped by the clamping device (not shown). At that time, a large amount of heat is transmitted from the upper and lower hot-temperature hot plates 27 and 28 to the right molds $39_R$ to rapidly heat the right molds $39_R$. When the preforms 13 (FIG. 32) have been softened, the core compressing device 84 (FIG. 26) is activated to push up the lower cores 61, whereby compression is initiated. During the compression process, the preforms 13 are compressed in the cavities of the right molds $39_R$. Consequently, the preforms 13 accurately copy the shape of the right top and bottom dies $37_R$ and $38_R$ to form products 20 (FIG. 32).

The left molds $39_L$ are annealed in the left annealing station $G_L$.

Figure 35:
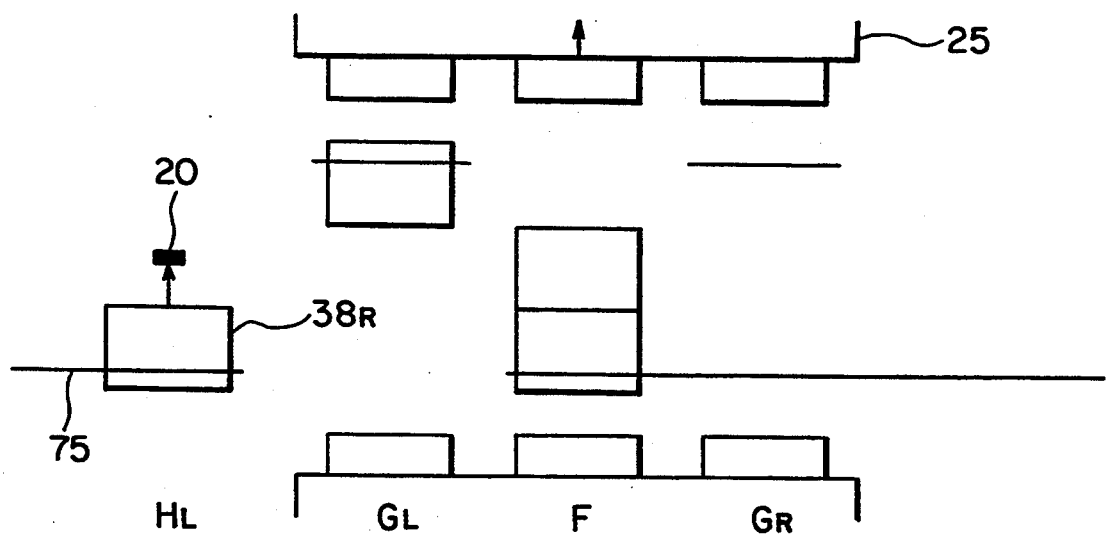

In FIG. 35, the upper platen 25 is moved up to open the left mold $39_L$ (FIG. 34), and the support rods 75 are retracted to move the left bottom dies $38_L$ from the left annealing station $G_L$ to the left preform introducing/product removal station $H_L$. In the left preform introduction/product removal station $H_L$, the ejecting device 90 (FIG. 26) is activated to push up the lower cores 61. Consequently, the products 20 are removed, and new preforms 13 (FIG. 29) are introduced, if necessary.

In the third embodiment, since the left and right molds $39_L$ and $39_R$ are supported by the pair of support rods 75, it is not necessary for the rails to be provided in the lower portion of the glass compression molding apparatus. Therefore, the upper surface of each of the lower left annealing hot plate $30_L$, the lower high-temperature hot plate 28 and the lower right annealing hot plate $30_R$ can be made flat, and the structure thereof can thus be simplified while the durability and temperature control can be improved. Furthermore, the size of the glass compression molding apparatus can be reduced, facilitating the maintenance and management thereof.

It is to be noted that the invention is not limited by any of the details of the above description but modifications and variations of the invention are possible without departing from the spirit and scope thereof.

What is claimed is:

1. A glass compression molding apparatus comprising:
   a upper, horizontal platen;
   a lower platen, extending parallel to said upper platen;
   at least one top die mounted for movement along one dimension of said upper platen, between a first plurality of horizontally spaced stations;
   at least one bottom die mounted for movement along one dimension of said lower platen, between a second plurality of horizontally spaced stations;
   a clamping device for bringing said upper and lower platens together, thereby clamping said upper die and said lower die together to hold a glass preform therebetween;
   conveying means for suspending said bottom die above said lower platen and for imparting said movement to the suspended bottom die; and
   compression means for moving one of said dies relative to the other die to compress the glass preform into a molded glass product.

2. A glass compression molding apparatus according to claim 1 wherein said first plurality of stations comprises a first station at which clamping, heating and compression are performed and a second station at which annealing is performed; and
   wherein said second plurality of stations includes said first and second stations and a third station where glass preforms are introduced into the lower die and products are removed.

3. A glass compression molding apparatus according to claim 2 wherein said second station includes left and right annealing substations located at positions on opposite sides of and adjacent said first station;
   wherein said third station includes a left substation located adjacent to said left annealing substation and a right substation located adjacent to said right annealing substation;
   wherein said apparatus includes at least two of said top dies, each of said two top dies being movable between said left annealing substation and said first station and the second of said two top dies being movable between said right annealing substation and said first station; and
   wherein said apparatus includes at least two of said bottom dies, each bottom die being movable between one of the two annealing substations, said first station and one of the two substations included in said third station.

4. A glass compression molding apparatus according to claim 3 wherein said conveying means comprises:
   a support rod having a distal end supporting said bottom die and a supported end; and
   reciprocating drive means for supporting the supported end of said support rod and for driving said support rod back and forth with linear motion to move the supported die between at least two of said second plurality of stations.

5. A glass compression molding apparatus according to claim 4 wherein said conveying means further comprises at least one rail, upon which said bottom die is slidably mounted.

6. A glass compression molding apparatus according to claim 2 wherein said conveying means comprises:
   a support rod having a distal end supporting said bottom die and a supported end; and
   reciprocating drive means for supporting the supported end of said support rod and for driving said support rod back and forth with linear motion to move the supported die between at least two of said second plurality of stations.

7. A glass compression molding apparatus according to claim 6 wherein said conveying means further comprises at least one rail, upon which said bottom die is slidably mounted.

8. A glass compression molding apparatus according to claim 2 further comprising:
   a first hot plate mounted on said upper platen at said second station and a second hot plate mounted on said lower platen at said second station, said first and second hot plates being brought together by operation of said clamping device for clamping and heating a top die and a bottom die therebetween; and
   a third hot plate mounted on said upper platen at said first station and a fourth hot plate mounted on said lower platen at said first station said third and fourth hot plates being brought together by operation of said clamping device for clamping and heating a top die and a second die therebetween.

9. A glass compression molding apparatus according to claim 1 wherein said conveying means comprises:
   a support rod having a distal end supporting said bottom die and a supported end; and
   reciprocating drive means for supporting the supported end of said support rod and for driving said support rod back and forth with linear motion to move the supported die between at least two of said second plurality of stations.

10. A glass compression molding apparatus according to claim 9 wherein said conveying means further comprises at least one rail, upon which said bottom die is slidably mounted.

11. A glass compression molding apparatus according to claim 1 further comprising support means for slidably supporting said top die at one of said first plurality of stations and for releasing said top die for travel with said bottom die to a second of said first plurality of stations.

12. A glass compression molding apparatus according to claim 11 wherein said support means includes at least one rail upon which said top die is slidably mounted.

* * * * *